United States Patent
Faust et al.

(10) Patent No.: US 10,875,380 B2
(45) Date of Patent: Dec. 29, 2020

(54) CLIMATE CONTROL

(71) Applicant: Apple Inc., Cupertino, CA (US)

(72) Inventors: Derek A. Faust, Mount Pleasant, SC (US); Emery A. Sanford, San Francisco, CA (US); James Foster, London (GB)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 15/505,603

(22) PCT Filed: Aug. 20, 2015

(86) PCT No.: PCT/US2015/046153
§ 371 (c)(1),
(2) Date: Feb. 21, 2017

(87) PCT Pub. No.: WO2016/029044
PCT Pub. Date: Feb. 25, 2016

(65) Prior Publication Data
US 2018/0001734 A1    Jan. 4, 2018

Related U.S. Application Data

(60) Provisional application No. 62/040,380, filed on Aug. 21, 2014.

(51) Int. Cl.
*B60H 1/00* (2006.01)

(52) U.S. Cl.
CPC ..... *B60H 1/00064* (2013.01); *B60H 1/00742* (2013.01); *B60H 1/00842* (2013.01);
(Continued)

(58) Field of Classification Search
CPC ............ B60H 1/00064; B60H 1/00742; B60H 1/00842; B60H 1/00871; B60H 1/00983; B60H 1/00985; B60H 2001/00185
(Continued)

(56) References Cited

U.S. PATENT DOCUMENTS 4,873,649 A * 10/1989 Grald ..................... F25B 49/02
700/276
5,400,963 A    3/1995 Ishikawa et al.
(Continued)

FOREIGN PATENT DOCUMENTS

DE    10 2006 009303    6/2007
DE    10 2007 041903    3/2009
DE    10 2008 018397    10/2009

OTHER PUBLICATIONS

International Preliminary Report on Patentability from Application No. PTC/US2015/046153, dated Mar. 2, 2017, Apple Inc., pp. 1-9.

*Primary Examiner* — Steven B McAllister
*Assistant Examiner* — Dana K Tighe
(74) *Attorney, Agent, or Firm* — Robert C. Kowert; Kowert, Hood, Munyon, Rankin & Goetzel, P.C.

(57) ABSTRACT

Some embodiments provide a vehicle climate control system for controlling climate conditions in various cabin regions of a vehicle cabin, where the climate control system is configured to control one or more vehicle components to change the set of climate conditions associated with one or more cabin regions to approximate a set of optimal comfort conditions. The climate control system controls various vehicle components to control climate conditions, including window assemblies, sunroof assemblies, etc. The climate control system determines optimal comfort conditions which optimize perceived temperature of various occupant body parts and maintain various climate characteristics within one or more sets of thresholds. Output configurations of various vehicle components can be determined based at least in part upon determined optimal comfort conditions of various cabin regions. Output configurations can be generated based at least in part upon various control mode priorities.

20 Claims, 10 Drawing Sheets

(52) U.S. Cl.
CPC ..... *B60H 1/00871* (2013.01); *B60H 1/00892* (2013.01); *B60H 1/00985* (2013.01); *B60H 2001/00185* (2013.01)

(58) Field of Classification Search
USPC .......................................................... 454/75
See application file for complete search history.

(56) References Cited

U.S. PATENT DOCUMENTS

| | | | |
|---|---|---|---|
| 6,732,938 B1 | 5/2004 | Wang et al. | |
| 7,089,087 B2 * | 8/2006 | Dudley ................... | F24F 11/30 700/276 |
| 8,096,482 B2 * | 1/2012 | Dage .................. | B60H 1/00657 123/179.2 |
| 2008/0147270 A1 * | 6/2008 | Sakane ............. | B60H 1/00792 701/36 |
| 2009/0130966 A1 * | 5/2009 | Tucker ............... | B60H 1/00821 454/75 |

* cited by examiner

CLIMATE CONTROL

This application is a continuation of International Application No. PCT/US2015/046153, filed Aug. 20, 2015, which claims priority to U.S. Provisional Patent Application No. 62/040,380, filed Aug. 21, 2014, which are hereby incorporated by reference herein in their entirety.

BACKGROUND

Technical Field

This disclosure relates generally to climate control in various regions of a vehicle cabin, which can include an automobile cabin.

Description of the Related Art

Vehicle climate control systems often rely upon one or more air-conditioning units, also referred to herein as an "ACU", and one or more heater units, to control a climate in various portions of a vehicle cabin. Such control can include directing air, at least partially conditioned or heated by one or more elements, into various regions of the vehicle cabin, also referred to herein as "cabin regions", via various air vents located throughout the cabin, heating various surfaces in the cabin through heating elements, etc.

In some cases, such control is at least partially implemented by a climate control system included in the vehicle. The climate control system can respond to user commands, provided via one or more interfaces in the vehicle, including dials, knobs, touch-screen interfaces, etc. In some cases, the climate control system can generate a particular configuration of some climate control components to effect a particular change in climate conditions in one or more cabin regions and generate output commands to the climate control components to achieve the generated configuration. For example, based at least in part upon a user interacting with a climate control system interface to command that a particular cabin region have a particular air temperature, the climate control system can generate a configuration of air vents, ACUs, heater units, etc. which changes the air temperature in the cabin region to the particular temperature and generate one or more sets of output commands to various vehicle components, including air moving devices, heater units, ACUs, etc. to implement the configuration to achieve the user-commanded climate condition in the cabin region.

In some cases, climate conditions in a vehicle cabin may be relatively uncomfortable for the occupant(s) therein, particularly when such occupants initially enter the vehicle cabin from an exterior environment, when the vehicle has been turned-off in an exterior environment for a period of time, some combination thereof, etc. For example, when a vehicle is left outdoors on a hot day, the interior temperature may reach temperatures well in excess of the exterior temperature, and reducing the interior temperature to a more comfortable level may require an extended period of operation of the ACU at a high operating level. In another example, where an overheated individual enters the vehicle cabin, the user may desire that the vehicle cabin climate conditions be rapidly changed.

However, some climate control systems may be limited in providing such functionality. For example, airflow provided into the cabin from various cabin air vents, and conditioning or heating of such airflow and various cabin surfaces, may not provide sufficient granularity in climate control of one or more particular cabin regions occupied by one or more occupants to provide comfortable climate conditions to the occupants. Climate control systems may be limited in a capacity to anticipate optimal configurations (e.g., operating settings) of various climate control components for various situations, and for various particular users.

In addition, some climate control components, when operating at a high level of operation to rapidly change climate conditions, can induce an uncomfortable experience for some occupants, thereby becoming counterproductive with regard to the purpose of providing comfort to the occupants. For example, an air vent which is expelling conditioned air into the cabin at a maximum vent flow rate may result in the occupant experiencing an uncomfortable sensation due to a high velocity of an airflow flowing in contact with one or more sensitive areas of the occupant's body.

Furthermore, at least some of the various climate control components included in a vehicle require substantial expenditures of energy, also referred to herein as energy usage, in order to function. For example, an ACU may require substantial expenditures of electrical power to function. Where such electrical power is derived from an onboard energy source, including a battery, which can have a finite capacity of electrical power to distribute to climate control components, utilization of such climate control components can have a detrimental effect upon the capacity of the vehicle operate various vehicle components associated with other functions, including driving functions, and may negatively affect the capacity of the vehicle to deliver one or more occupants to one or more destinations.

SUMMARY OF EMBODIMENTS

Some embodiments provide a vehicle climate control system for controlling climate conditions in various cabin regions of a vehicle cabin, where the climate control system is configured to control one or more vehicle components to change the set of climate conditions associated with one or more cabin regions to approximate a set of optimal comfort conditions. The climate control system is configured to control various vehicle components to control climate conditions, including window assemblies, sunroof assemblies, etc. The climate control system is configured to determine optimal comfort conditions, for one or more cabin regions, which optimize perceived temperature of various occupant body parts and maintain various climate characteristics, including airflow, humidity, temperature, etc. within one or more sets of thresholds. Output configurations of various vehicle components can be determined based at least in part upon determined optimal comfort conditions of various cabin regions. Output commands to various vehicle components can be generated based at least in part upon generated output configurations of the various vehicle components. Optimal comfort conditions, output configurations, output commands, etc. can be generated based at least in part upon determinations that one or more external users are anticipated to occupy one or more cabin regions. Output configurations can be generated based at least in part upon various control mode priorities including priorities which prioritize minimizing vehicle component energy usage, priorities which prioritize minimizing elapsed time to change climate conditions to approximate optimal comfort conditions, some combination thereof, etc.

Figure 1A:
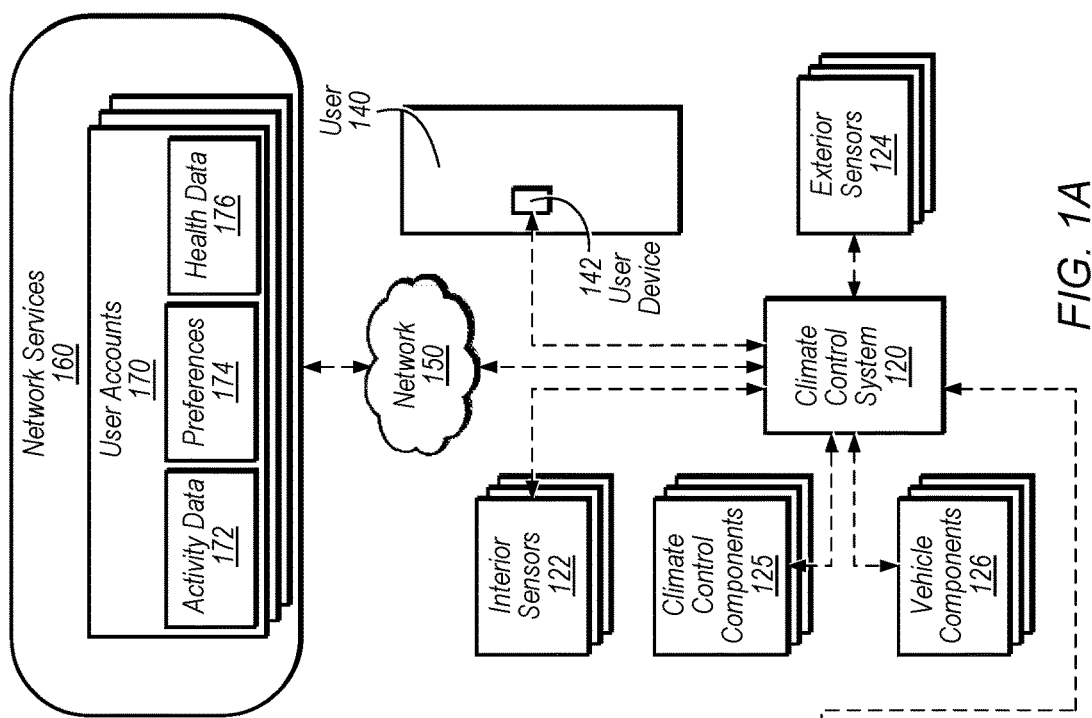
FIG. 1A illustrates a schematic diagram of a vehicle including a vehicle climate control system and interactions between such a climate control system and various vehicle components and systems internal and external to the vehicle, according to some embodiments.
Figure 1A:
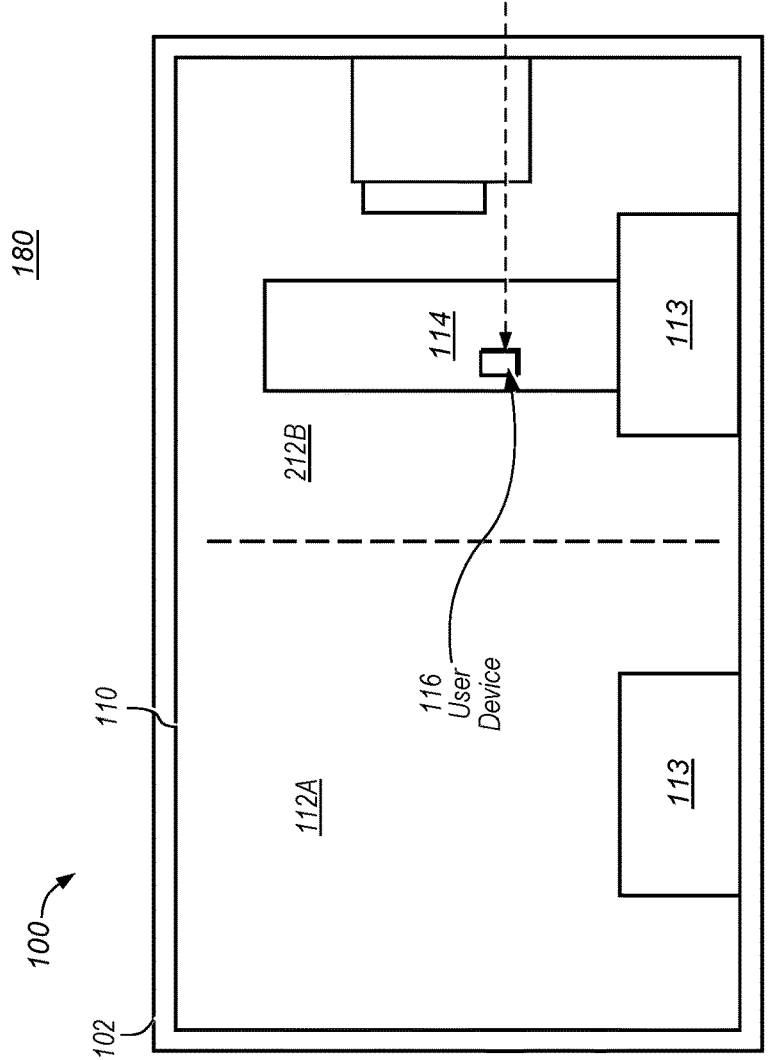

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide a system, which can include a climate control system, for controlling climate conditions in various cabin regions of a vehicle cabin. As described herein, a vehicle can include an automobile. In some embodiments, the system is implemented by one or more computer systems. The system can be communicatively coupled to various input data sources, including climate sensors of the vehicle which provide various indications of internal and external climate conditions in various regions, end-user devices, also referred to herein as "user devices", which provide data associated with a supported user, computer systems which are located remotely from a vehicle, referred to herein as "remote computer systems", and provide data associated with user activities, schedules, health, preferences, etc., remote computer systems which provide data associated with weather conditions and forecasts in various regions, etc. The system can be communicatively coupled to various components included in the vehicle, referred to herein as "vehicle components" and is configured to control same, including cabin air vents, air exhaust vents, air inlet vents, air moving devices, one or more ACUs, one or more heater units, one or more window assemblies, one or more mirror assemblies, one or more sunroof assemblies, etc. The system is configured to adjustably control the various vehicle components to optimize the comfort of various occupants of the cabin while minimizing the elapse of time, and energy usage by various vehicle components, required to achieve such optimized comfort.

In some embodiments, a climate control system included in a vehicle, also referred to herein as a "vehicle climate control system", is configured to control various vehicle components, based at least in part upon control of one or more control elements of same, to optimize the climate conditions in one or more particular cabin regions. The climate control system can adjustably control the vehicle components based at least in part upon input data associated with one or more particular users which are presently externally located relative to the vehicle. Such input data can include user climate preferences, user activity data, user schedules and historical activity patterns, user health data, some combination thereof, etc.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device can support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Vehicle Climate Control System

Some embodiments include a climate control system of a vehicle, also referred to herein as a "vehicle climate control system", which is communicatively coupled to various components that are included in the vehicle and components which are external to same. Some components included in the vehicle, also referred to herein as "vehicle components", are configured to provide functionality, which is not exclusive to climate control, to an occupant of the vehicle. The climate control system, in some embodiments, is configured to control various vehicle components to optimize the climate of various cabin regions, relative to one or more occupants of said regions. The climate control system can implement a particular configuration of the various vehicle components which results in an optimized elapsed time to optimize the climate, optimized energy usage of one or more energy sources to optimize the climate, some combination thereof, etc. The climate control system, in some embodiments, is configured to control various vehicle components to control climate conditions in one or more cabin regions, based at least in part upon user data associated with a user external to the vehicle cabin.

FIG. 1A illustrates a schematic diagram of a vehicle climate control system and interactions between such a climate control system and various components and systems internal and external to the components of the vehicle, according to some embodiments.

System 100 includes a vehicle 102 which itself includes a vehicle cabin 110, also referred to herein as a "cabin", comprising multiple cabin regions 112A-B. Each region 112 can be associated with a particular portion of the interior volume of the cabin 110. In some embodiments, each region 112 is associated with a particular one or more seats 113 encompassed within the respective region 112 and can comprise a portion of the interior volume of the cabin 110 which encompasses at least the particular one or more seats 113. Each seat 113 can be configured to accommodate at least one individual 114, such that the individual 114 is an "occupant" of the vehicle 102. The region 112 encompassing the seat 113 which is occupied by the occupant 114 can be referred to as an "occupied" cabin region. Regions 112 in which no individuals are present can be referred to as "unoccupied" cabin regions 112. For example, in the illustrated embodiment of FIG. 1A, region 112A is an unoccupied cabin region and region 112B is an occupied cabin region.

Vehicle 102 includes a climate control system 120, interior and exterior sensors 122, 124, and multiple sets of components included in the vehicle, referred to herein as "vehicle components". Some vehicle components are configured to provide climate control functionality which results in a tangible effect upon climate conditions within the vehicle cabin and with respect to one or more cabin regions 112 and have no separate functionality other than climate control functionality; such components can be referred to as "climate control components" 125. Climate conditions can include one or more of air dry bulb temperature (herein "temperature"), air wet bulb temperature, air relative humidity, air volumetric flow rate and direction, air mass flow rate and direction, air flow velocity, solar radiance, some combination thereof, cabin surface temperature, etc. Such components can include cabin air inlets, cabin air exhausts, cabin air vents, air conditioning units, heater units, etc. Some vehicle components 126 are not exclusively configured to provide climate control functionality, but can provide one or more functions which can result in a tangible effect upon climate conditions within the vehicle cabin. Such components can include window assemblies, sunroof assemblies, mirror assemblies, etc.

Climate control system 120 is communicatively coupled to various internal environmental sensors 122, referred to interchangeably herein as "internal sensors", and various external environment sensors 124, referred to interchangeably herein as "external sensors". The various internal sensors 122 can be located throughout the various cabin regions 112 included in the cabin 110. In some embodiments, one or more internal sensors are included in one or more cabin surfaces, including a dashboard, one or more portions of a seat 113, one or more portions of a cabin door, etc. One or more internal sensors 122, in some embodiments, are configured to measure one or more sets of environmental conditions associated with one or more portions of one or more cabin regions 112. In some embodiments, one or more internal sensors 122 are configured to measure environmental conditions in multiple cabin regions 112. In some embodiments, one or more internal sensors 122 are configured to measure data associated with various surfaces, some or all of one or more particular body parts of one or more occupants 114, some combination thereof, etc. For example, one or more internal sensors 122 can comprise a camera device configured to monitor temperatures associated with various cabin surfaces, including portions of one or more seats 113, in one or more cabin regions 112. In another example, one or more internal sensors 122 can comprise a camera device configured to monitor body temperatures of one or more particular body parts of one or more particular occupants 114 of one or more regions 112. Sensor data generated by the various internal sensors 122 can be communicated to the climate control system 120 via one or more communication conduits.

The various external sensors 124 can be located throughout various exterior surfaces of the vehicle 100 and can each measure various sets of environmental conditions associated with one or more portions of the exterior of the vehicle, an external environment 180, interfaces between the vehicle 102 interior and exterior, some combination thereof, etc. In some embodiments, one or more external sensors 124 can measure environmental conditions proximate to various portions of the vehicle 102 exterior. In some embodiments, one or more external sensors 124 are configured to measure environmental conditions associated with particular portions of the vehicle 102 exterior. For example, one or more external sensors 124 can comprise a temperature sensor associated with a cabin air inlet which directs air from an external environment 180 and into the cabin 110, a cabin air exhaust which directs air out of the cabin 110 and into the external environment 180, an ACU air inlet which directs air from an external environment 180 and into an air conditioning unit, a radiance sensor which measures solar radiance on a particular window included in a particular window assembly of the vehicle 102, a radiance sensor which measures solar radiance on a particular sunroof included in a particular sunroof assembly of the vehicle 102, a humidity sensor which measures relative humidity of the external environment 180, a wind sensor which measures wind velocity, flowrate, etc. at one or more locations which are proximate to one or more particular portions of the exterior of the vehicle 102, some combination thereof, etc. Sensor data generated by the various external sensors 124 can be communicated to the climate control system 120 via one or more communication conduits.

Climate control system 120 is configured to communicatively couple with one or more user devices 116, 142 supporting one or more various individuals, including occupants 114 of the vehicle 102 and users 140 which are presently external to the vehicle 102. Such user devices 116, 142 can include one or more various wireless communication devices, electronic devices, computer systems, some combination thereof, or the like. The climate control system 120 can communicate with the various user devices 116, 142 to determine a physical location of the devices, relative to the vehicle cabin 110. In some embodiments, the climate control system 120 is configured to communicate with one or more user devices 116, 142 to access data associated with the one or more users 114, 140 supported by the respective user devices. To communicate with such user devices, the climate control system 120, in some embodiments, is configured to establish one or more ad hoc wireless networks, which can include one or more mobile ad hoc networks. Accessed data can include various user data, including user health data, user activity data, user preferences, some combination thereof, etc., which can be utilized by the climate control system to determine output configurations, output commands, etc. with regard to various cabin regions, various climate control components 125 and vehicle components 126, etc. User data can be identified as being associated with the particular user supported by the user device. User health data can include historical and present health data associated with the user, including current body temperature, pulse, blood pressure, heart rate, historical trends associated with one or more thereof, etc. User activity data can include data indicating a present activity, transaction, etc. which the user is performing via interaction with the user device, an activity, transaction, etc. which the user has performed, via interaction with the user device, within a certain period of time of the present. User activity data can include user activity schedules, historical user activity trends and patterns, some combination thereof, etc. User preferences can include indications of user preferences regarding climate conditions in the cabin 110 of the vehicle 102.

Climate control system 120, in some embodiments, is communicatively coupled to one or more network services 160, via one or more communication networks, such that the climate control system 120 is configured to receive user data, environmental data, some combination thereof, etc. from one or more such services. In the illustrated embodiment of FIG. 1A, climate control system 120 is communicatively coupled with one or more network services 160 via one or more communication networks 150. Such communication networks can include one or more wireless networks, wireless ad hoc networks, mobile ad hoc networks, cellular communication networks, satellite communication networks, optical communication networks, some combination thereof, or the like. One or more network services 160 can be implemented by one or more computer systems and can include one or more user accounts 170, stored in one or more computer systems, one or more cloud storage systems, etc. A user account 170 can include data associated with a particular user, which can include one or more particular occupants 114 of the vehicle 102, one or more users supported by one or more particular user devices 116, 142 with which the climate control system is communicatively coupled, some combination thereof, etc. In some embodiments, a user account 170 includes one or more of user activity data 172, user preferences 174, user health data 176, some combination thereof, or the like. User health data 176 can include historical and present health data associated with the user, including current body temperature, pulse, blood pressure, heart rate, historical trends associated with one or more thereof, etc. User activity data 172 can include data indicating a present activity, transaction, etc. which the user is performing via interaction with the user device, an activity, transaction, etc. which the user has performed, via interaction with the user device, within a certain period of time of the present. User activity data can include user activity schedules, historical user activity trends and patterns, some combination thereof, etc. User preferences 174 can include data indicating one or more user preferences regarding climate conditions in a cabin 110 of one or more vehicles 102 in which the associated user can become an occupant.

Users can benefit from use of climate control in various regions of a vehicle cabin. For example, the personal data can be used to optimize comfort of a user when the user is occupying a vehicle cabin. Accordingly, use of data included in a user account 170, also referred to herein as personal data, enables users to influence climate control and thus user comfort, control climate control and thus user comfort, some combination thereof, etc.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

Climate control system 120 is communicatively coupled to both the various climate control components 125 included in the vehicle 102, including air conditioning units, cabin air vents, heater units, etc., and various other vehicle components 126, including cabin window assemblies, sunroof assemblies, etc. Climate control system 120 is configured to generate commands signals to both one or more control elements of one or more climate control components 125 and one or more control elements of one or more vehicle components 126 to control the climate conditions in one or more cabin regions 112 in the vehicle cabin 110.

In some embodiments, climate control system 120 is configured to generate output commands to particular control elements of various climate control components 125 and vehicle components 126, based at least in part upon input data from one or more internal sensor 122, external sensors 124, user devices 116, 142, network services 160, some combination thereof, etc., to control climate conditions in one or more particular cabin regions 112 of the vehicle cabin 110. Such controlling of climate conditions in one or more cabin regions 112 can include controlling the climate conditions in the one or more regions to approximate, within one or more margin ranges of one or more climate characteristics (e.g., temperature, relative humidity, air flow rate, etc.), a particular determined "optimal comfort condition" associated with one or more occupants 114 of the one or more regions 112, one or more users 140 anticipated to become an occupant within a certain time period, etc. The climate control system 120 can determine an optimal comfort condition for each of the regions 112 based at least in part upon some or all of the input data. In some embodiments, the climate control system 120 selectively controls particular control elements of particular components 125, 126 to reduce, minimize, etc. energy usage, by the various components 125, 126, which is associated with controlling the climate conditions based at least in part upon control of one or more components 125, 126. In some embodiments, the climate control system 120 selectively controls particular control elements of particular components 125, 126 to reduce, minimize, etc. elapsed time required to change climate conditions in one or more cabin regions 112 to approximate a determined optimal comfort condition for the given cabin regions 112. In some embodiments, the climate control system 120 selectively controls particular components 125, 126 according to a particular output configuration which indicates particular configurations of particular components 125, 126. An output configuration can be determined based at least in part upon consideration of various control mode priorities which can prioritize, penalize, etc. certain aspects of an output configuration, including vehicle component energy usage, estimated time elapse to approximate climate conditions with optimal comfort conditions within one or more margins, variability of climate conditions relative to the optimal comfort condition, some combination thereof, etc. In some embodiments, the climate control system 120 is configured to generate, for one or more regions, multiple sets of output configurations which are each generated according to different control modes, and is further configured to synthesize a final set of output configurations for each cabin region, based at least in part upon synthesis of two or more particular sets of output configurations.

Figure 1B:
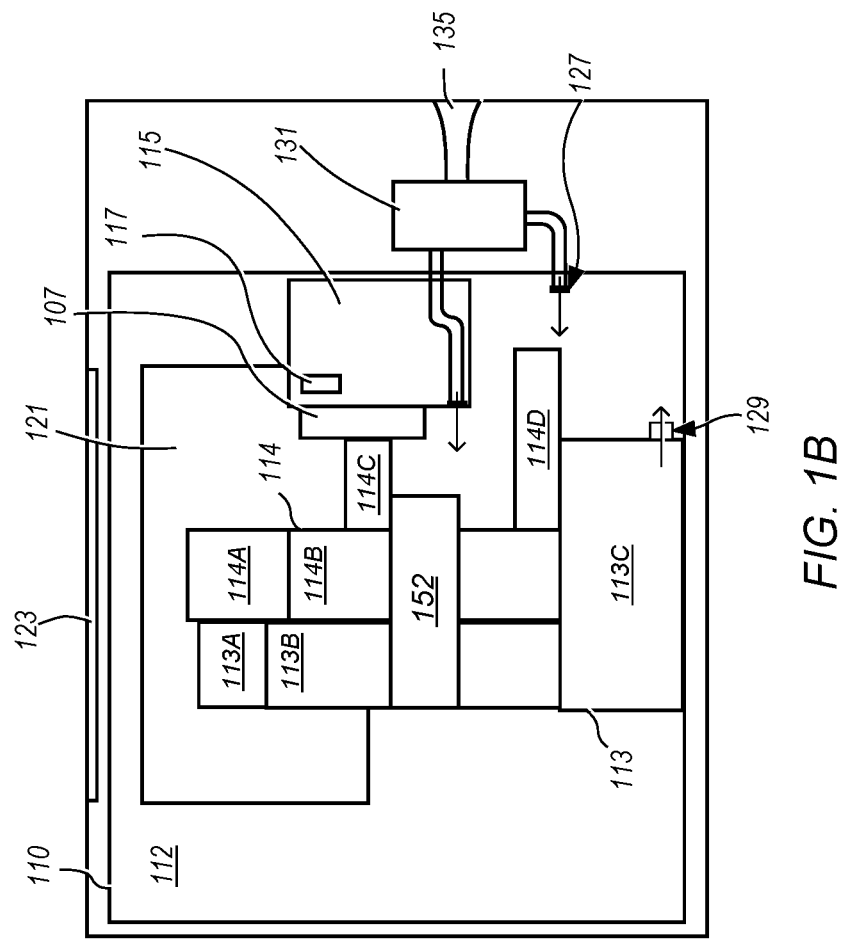
FIG. 1B illustrates a perspective view of a vehicle cabin region and various vehicle components controllable by a climate control system to adjust climate conditions therein, according to some embodiments.

FIG. 1B illustrates a perspective view of a vehicle cabin region 112, which can be included in the cabin 110 of the vehicle 102 illustrated in FIG. 1A, and various vehicle components controllable by a climate control system to adjust climate conditions therein, according to some embodiments. Each of the various vehicle components illustrated in FIG. 1B can be included in one of the components 125, 126 illustrated in FIG. 1A.

Cabin region 112 includes a seat 113 which is configured to accommodate an individual 114, such that the individual is an "occupant" of the cabin region 112 and the cabin region 112 is referred to as an "occupied" region. Where the occupant 114 is absent from the region, the region can be referred to as an "unoccupied region".

In some embodiments, a climate control system is configured to control one or more particular control elements of one or more particular vehicle components to control climate conditions in one or more portions of a particular cabin region. The climate control system can be configured to control climate conditions, in each of various portions of a cabin region 112, based at least in part upon sensor data associated with particular portions, body parts, etc. of one or more occupants 114 located within the particular portions of the cabin region 112. In the illustrated embodiment, an occupant 114 of region 112 includes various particular body parts 114A-D; each separate portion of a given cabin region can correspond to a separate set of body parts of occupant 114, and a climate control system can control climate conditions in each region portion to control the climate conditions proximate to the associated body part 114A-D.

In some embodiments, an internal sensor located in a vehicle includes one or more sensors which can generate sensor data associated with the various portions of an occupant's body; such sensor data can be utilized by a climate control system to control climate conditions in one or more region portions associated with the body parts. For example, a camera device 117 can be included in a vehicle in which region 112 is located, where the camera device 117 can generate sensor data associated with each of the body parts 114A-D of occupant 114. In some embodiments, the camera 117 is an infrared camera which can generate sensor data indicating one or more sets of body temperatures associated with the separate body parts 114A-D. Such sensor data can be utilized by a climate control system to control climate conditions in region portions associated with the various body parts to control the body temperatures of the associated body parts 114A-D.

Such control can include controlling surface temperatures of various cabin surfaces of the vehicle cabin which are proximate to the respective body parts. For example, the climate control system can control one or more cabin air vents 127 to direct one or more streams of air over one or more cabin surfaces, including a surface of one or more portions of armrest 152, one or more particular portions 113A-C of seat 113, one or more portions of dashboard 115, one or more portions of steering wheel 107, some combination thereof, etc.

In some embodiments, to control climate conditions in one or more portions of region 112, a climate control system can independently control various control elements of climate control components included in a vehicle in which region 112 is located. For example, the illustrated region includes cabin air vents 127, 129, located at various locations in the region 112; one or more of the cabin air vents 127, 129 can include control elements including one or more actuators, motors, etc. configured to adjust one or more of damper position, vent orientation, etc., and the climate control system can be configured to control one or more of the actuators, motors, etc. associated with the various cabin air vents 127, 129 to control one or more of air flowrate, airflow direction, some combination thereof, or the like into one or more particular portions of region 112. For example, in the illustrated embodiment, a climate control system can control actuators associated with cabin air vent 129 to direct a particular flow rate of air to flow in a direction which is oriented to flow between the legs 114D of the occupant 114, such that the airflow from the cabin air vent 129 does not impinge upon the occupant legs 114D. In another example, a climate control system can control actuators associated with one or more particular cabin air vents 127 to direct a maximum airflow rate from the particular vents 127 to flow across an upper surface of the armrest 152 to provide cooling to the surface, concurrently with controlling actuators associated with another particular set of vents 127 to direct a flowrate of air, which corresponds to a particular proportion of maximum flowrate capacity, to impinge upon the torso 114B of the occupant. The climate control system can control one or more components included in the ACU 131 to control cooling of the airflow passing through the vents 127 based at least in part upon sensor data generated by sensor 117, environmental sensor data associated with the air entering the ACU 131 via inlet 135 from the external environment, some combination thereof, etc.

In some embodiments, to control climate conditions in one or more portions of region 112, a climate control system can control one or more control elements of vehicle components which are not exclusively configured to provide climate control functionality. In the illustrated embodiment, for example, while cabin air vents 127, 129 and air conditioning unit 131 can be configured exclusively to provide climate control functionality, window 121 and sunroof 123 may not be exclusively configured to provide climate control functionality. The climate control system can control one or more actuators, motors, etc. associated with the window 121, sunroof 123, some combination thereof, etc. to control climate conditions in one or more portions of the region 112. For example, the climate control system may generate command signals to one or more particular control elements to at least partially open one or more of the window 121 and sunroof 123 to direct air from the exterior environment into the region 112, remove air from the region 112, etc. The climate control system can be configured to control the sunroof 123 and window 121 independently, and for independent purposes. For example, the climate control system can command a motor associated with window 121 to open the window 121 to a particular position to enable exterior air to enter the cabin to cool one or more portions of region 112, while the climate control system can independently command a motor associated with sunroof 123 to open the sunroof 123 to a particular position to enable warm air in the region 112 to exit the vehicle into an exterior environment.

Figure 2:
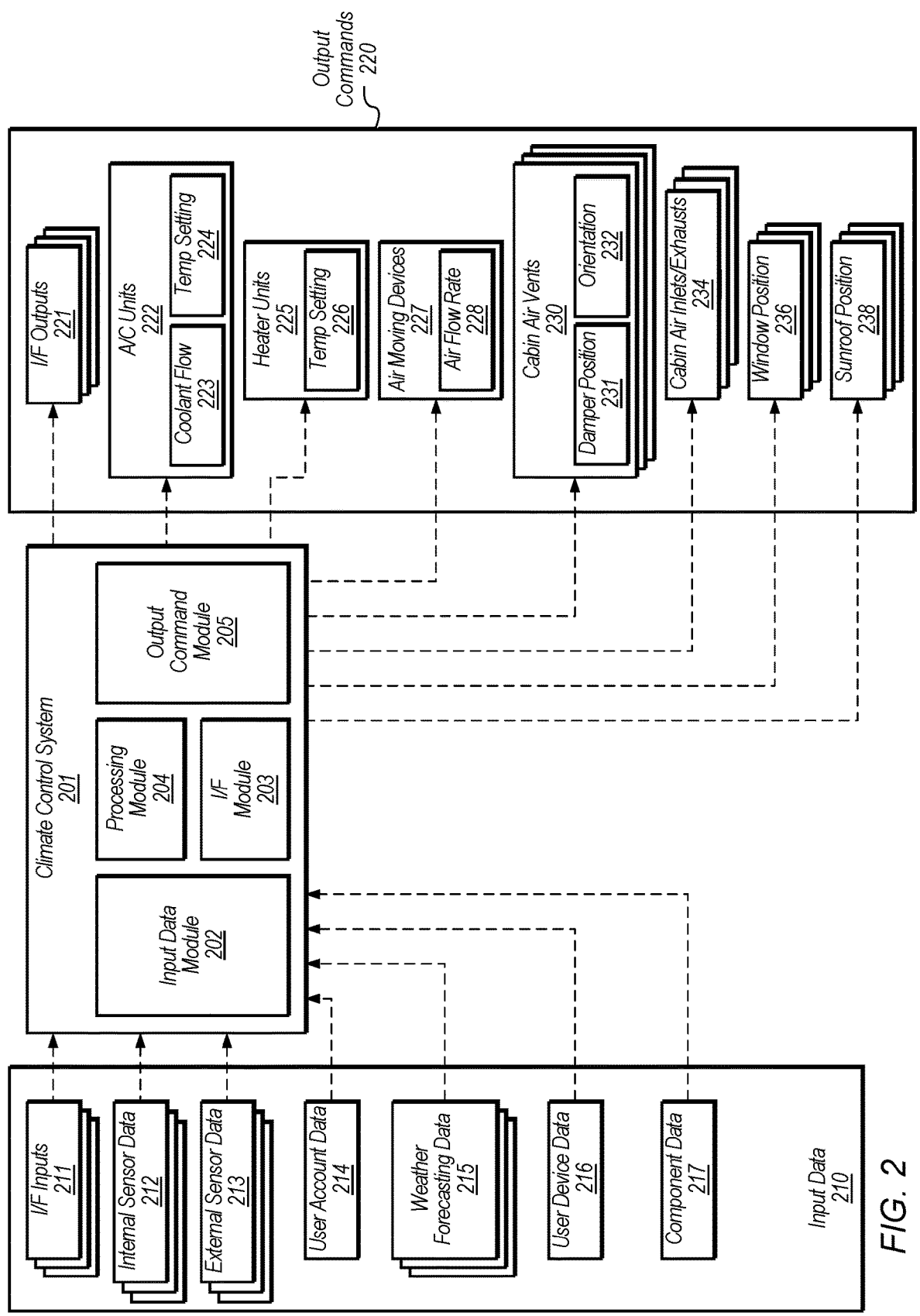
FIG. 2 illustrates a block diagram of a vehicle climate control system, various inputs into the climate control system from various input data sources, and various outputs from the climate control system to various vehicle components, according to some embodiments.

FIG. 2 illustrates a block diagram of a vehicle climate control system, various inputs into the climate control system from various input data sources, and various output commands from the climate control system to various vehicle components, according to some embodiments. The illustrated climate control system can be included in any of the climate control systems included in any of the embodiments illustrated herein and can be implemented, in whole or in part, by one or more computer systems included in a vehicle.

Figure 9:
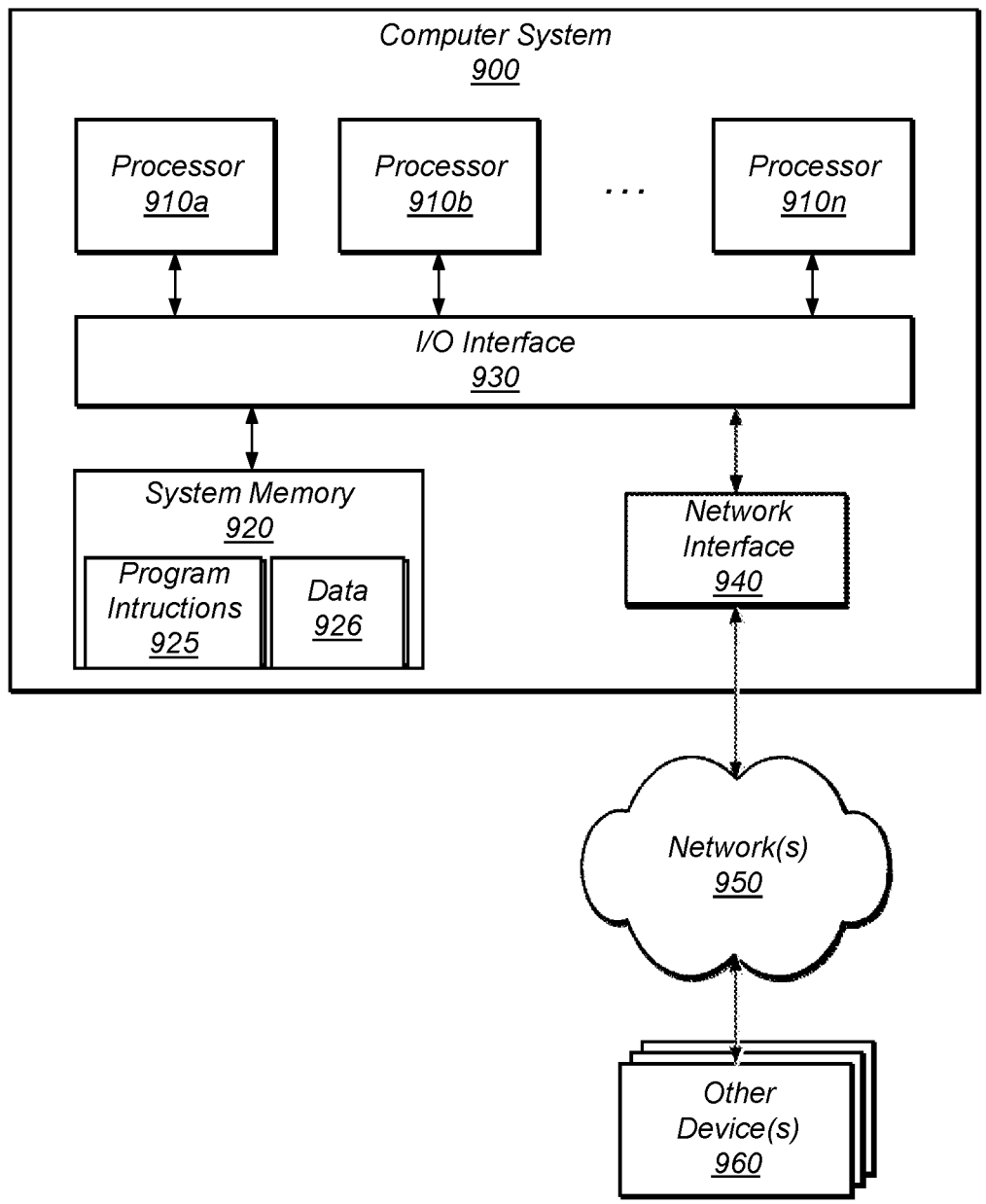
FIG. 9 illustrates an example computer system configured to implement aspects of a system and method for climate control, according to some embodiments.

System 200 includes a vehicle climate control system 201, also referred to herein as a "climate control system". The climate control system 201 is configured to generate output commands to one or more control elements of one or more various vehicle components, including climate control components, vehicle components which are separate from climate control components, etc., based at least in part upon input data received from various sources, as shown. Climate control system 201 includes an input data module 202, an interface module 203, a processing module 204, and an output command module 205. Each of the modules 202, 203, 204 and 205 may, in some embodiments be implements by hardware circuitry or by one or more hardware processors, e.g., by program instructions executed by the one or more hardware processors. Each of the modules 202, 203, 204 and 205 may be implemented by the same or different hardware processors. The hardware processors may be part of a computing device, such as illustrated in FIG. 9.

In some embodiments, climate control system 201 includes an input data module 202 which is configured to receive one or more various sets of input data 210 from one or more various data sources. In some embodiments, the input data module 202 is configured to at least partially process the various sets of input data 210 to determine present climate conditions in various cabin regions of the vehicle, various external environment conditions associated with various portions, vehicle components, etc. of the vehicle exterior, various conditions associated with one or more occupants of the vehicle, etc.

Input data 210 can include one or more sets of interface input data 211 received from one or more user interface devices included in a vehicle in which the climate control system 201 is included. Such input data 211 can include user commands generated at one or more user interface devices based at least in part upon user interaction with the one or more user interface devices. For example, where a user interface device included in a vehicle comprises a touch-screen interface, included in a dashboard of the vehicle, which displays a graphical user interface which itself includes various interactive icons, graphical representations, etc. associated with various particular user commands, the interface device can generate one or more user commands as input data 211 based at least in part upon user interaction with one or more particular interactive icons, graphical representations, etc.

Input data 210 can include one or more sets of internal sensor data 212 generated by one or more internal sensors located in the vehicle. Each internal sensor can generate sensor data associated with one or more climate condition characteristics of one or more cabin regions of a cabin of the vehicle. Such sensor data can include data indicating one or more climate conditions in one or more portions of one or more cabin regions, one or more characteristics of one or more body parts of one or more cabin occupants, some combination thereof, etc. For example, one set of internal sensor data 212 can comprise temperature data, generated by a particular internal temperature sensor located in a particular portion of a particular cabin region, which indicates the dry bulb temperature of that particular cabin region portion. In another example, another set of internal sensor data 212 can include body part temperature data, generated by one or more camera devices located in the vehicle, which indicate body temperatures of one or more body parts of the various occupants in one or more various particular cabin regions, including indications of the particular cabin regions in which each of the various body parts are located. In another example, a set of internal sensor data 212 can include body part data indicating whether more body parts of the various occupants in one or more various particular cabin regions are exposed or covered by one or more instances of clothing, thereby indicating a present sensitivity of the various body parts to temperature, impinging airflow, etc. In another example, a set of internal sensor data 212 can include airflow data, generated by one or more airflow sensors located in the vehicle, which indicate one or more of air flow velocity, air mass flow rate and direction, air volumetric flow rate and direction, some combination thereof, or the like in one or more particular portions of one or more particular cabin regions.

Input data 210 can include one or more sets of external sensor data 213 generated by one or more external sensors located in the vehicle. Each external sensor can generate sensor data associated with one or more climate condition characteristics of one or more portions of the exterior of the vehicle, which can include data associated with one or more characteristics of one or more portions of an external environment. Such sensor data can indicate one or more of dry bulb temperature, wet bulb temperature, relative humidity, wind flow rate, wind speed, wind flow direction, precipitation flow rate, solar radiance, some combination thereof, etc. Each external sensor can generate sensor data associated with a particular portion of the vehicle. For example, one set of external sensor data 213 can indicate a level of solar radiance on a particular window assembly included in a particular cabin door of the vehicle. In another example, one set of external sensor data 213 can indicate a dry bulb temperature of air entering a particular air inlet into an ACU of the vehicle. In another example, a set of external sensor data 213 can indicate a mass flow rate of air exiting the vehicle cabin through a particular air exhaust. In another example, a set of external sensor data 213 can indicate a flow velocity of wind flowing proximate to a sunroof assembly included in a roof of the vehicle.

Input data 210 can include one or more sets of user account data 214 associated with one or more user accounts of one or more network services. Such sets of data 214 can be received via a communicative connection between the climate control system 201 and one or more network services, implemented on one or more remote computer systems, via one or more communication networks. User account data 214 can include user activity data, user schedule data, user health data, user preference data, etc. associated with one or more users associated with the vehicle, present occupants of the vehicle, users within a certain physical proximity of the vehicle, some combination thereof, etc. Such data 214 can be received based at least in part upon queries generated at input module 202 for communication to the one or more network services via the one or more communication networks. Such queries can be generated based at least in part upon one or more of a determination that a particular user is associated with the vehicle in which system 201 is located, a determination that the particular user is presently an occupant of the vehicle, a determination that one or more particular users are presently within a certain physical proximity of the vehicle, some combination thereof, etc.

Input data 210 can include one or more sets of weather forecasting data 215 associated with one or more network services. The one or more sets of weather forecasting data 215 can include data indicating present environmental conditions, forecasted environmental conditions, etc. associated with a region in which the vehicle is presently located, a region in which the vehicle is projected to be located within a certain period of time based at least in part upon present velocity and road location of the vehicle, some combination thereof, etc.

Input data 210 can include one or more sets of user device data 216 supporting one or more users. Such sets of data 216 can be received via a communicative connection between the climate control system 201 and one or more user devices supporting the one or more users via one or more communication networks. Such communication networks can include one or more wireless networks, ad hoc wireless networks, mobile ad hoc networks, some combination thereof, etc. User device data 216 can include user activity data, user schedule data, user health data, user preference data, etc. associated with one or more users associated with the vehicle, present occupants of the vehicle, users within a certain physical proximity of the vehicle, some combination thereof, etc. Such data 216 can be received based at least in part upon queries generated at input module 202 for communication to the one or more user devices via the one or more communication networks. Such queries can be generated based at least in part upon one or more of a determination that a the one or more user devices are located in a particular physical location relative to the vehicle, including within one or more particular regions in the vehicle cabin, external to the vehicle and within a certain physical proximity of the vehicle, some combination thereof, etc.

Input data 210 can include one or more sets of vehicle component data 217 associated with one or more vehicle components included in the vehicle. Such data can indicate one or more present states associated with one or more particular control elements of one or more particular vehicle components. For example, one set of data 217 can indicate, for a particular air vent, a present damper position and orientation of the particular air vent. In another example, a set of data 217 can indicate, for a particular window assembly, a present position of the window included in the window assembly.

In some embodiments, input module 202 is configured to perform at least some processing of input data 210 to determine one or more present conditions associated with the vehicle, including present climate conditions throughout various cabin regions, present conditions associated with various body parts of various occupants of the vehicle, various states associated with various users, etc. In some embodiments, input module 202 can process various input data to determine one or more gradients of environmental conditions throughout various cabin regions.

In some embodiments, interface module 203 is configured to generate one or more user interfaces to be presented to one or more vehicle occupants via one or more interface devices included in the vehicle. Such user interfaces can be at least partially interactive and can include one or more graphical representations. Module 203, in some embodiments, is configured to present a graphical user interface which includes various icons, graphical representations, etc. based at least in part upon one or more aspects of system 201, including various input data received at module 202, determinations made at module 204, output commands generated at module 205, some combination thereof, etc. Such generated graphical user interfaces can be transmitted to one or more interface devices as interface output data 221 via output command module 205.

In some embodiments, processing module 204 is configured to determine optimal comfort conditions for one or more cabin regions of the vehicle and establish one or more sets of output configurations, of one or more various vehicle components included in the vehicle, to approximate climate conditions in one or more cabin regions to the optimal comfort conditions of the one or more cabin regions under certain priorities, which can include optimizing one or more of occupant comfort, energy usage, elapsed time required to increase client comfort, some combination thereof, etc. Such established sets of output configurations can be based at least in part upon various determined control mode priorities, also referred to herein as "weights", "constraints", etc., various sets of input data, etc. In some embodiments, such established sets of output configurations comprise one or more sets of output configurations which are synthesized at module 204 from multiple separate sets of output configurations generated according to separate control mode priorities.

Output command module 205 is configured to generate one or more sets of output commands 220, to one or more particular control elements of one or more particular vehicle components, based at least in part upon one or more sets of output configurations established at module 204. Output commands can be generated for transmission to one or more control elements of one or more vehicle components and can include one or more command signals which control one or more control elements, including actuators, motors, etc. of said components.

Output commands 220 can include one or more sets of output commands 222 to one or more control elements of one or more particular ACUs within the vehicle. Such control elements can include one or more valves, dampers, drive motors, actuators, some combination thereof, etc. Output commands 222 can include output commands 223 to one or more elements of the ACU to control a flowrate of coolant in the ACU, one or more commands 224 to control a temperature of conditioned air exiting the ACU, one or more commands to control an airflow induced by one or more air moving devices (e.g., fans, compressors, blowers, etc.) associated with the ACU, some combination thereof, etc.

Output commands 220 can include one or more sets of output commands 225 to one or more control elements of one or more particular heater units within the vehicle. Such control elements can include one or more valves, dampers, drive motors, actuators, some combination thereof, etc. Output commands 225 to one or more heater units can include one or more sets of commands to control heating by one or more heating elements included in the one or more heater units, one or more sets of commands to one or more air moving devices associated with the heater units to control air flow in thermal communication with the one or more heating elements, one or more sets of commands 226 to one or more control elements to control a temperature of air exiting one or more heater units, some combination thereof, etc.

Output commands 220 can include one or more sets of output commands 227 to one or more control elements of one or more air moving devices within the vehicle. Such elements can include one or more control elements, dampers, drive motors, actuators, some combination thereof, etc. The one or more sets of output commands 227 can include one or more sets of commands 228 to one or more elements to control a flow rate induced by the one or more air moving devices, one or more sets of commands to one or more control elements to control one or more orientations of one or more air moving devices, relative to at least some other portions of the vehicle, some combination thereof, etc.

Output commands 220 can include one or more sets of output commands 230 to one or more control elements of one or more cabin air vents included in the cabin of the vehicle. Such control elements can include one or more dampers, drive motors, actuators, some combination thereof, etc. Such output commands 230 to one or more control elements of one or more air vents can include one or more commands 231 to one or more control elements to control a position of one or more dampers included in the one or more air vents, one or more commands 232 to one or more control elements to control an orientation of one or more air vents, some combination thereof, or the like.

Output commands 220 can include one or more sets of output commands 234 to one or more control elements of one or more air inlets, air exhausts, etc. located on the exterior of the vehicle. Such control elements can include one or more dampers, drive motors, actuators, some combination thereof, etc. Such output commands 234 can include one or more commands to one or more control elements to control a position of one or more dampers included in the one or more air inlets, air exhausts, etc.

Output commands 220 can include one or more sets of output commands 236 to one or more control elements of one or more window assemblies included in the vehicle. Such control elements can include one or more drive motors, actuators, some combination thereof, etc. Such output commands 236 can include one or more commands to one or more control elements to control a position of the one or more windows included in one or more window assemblies. Output commands to control elements of one window assembly included in the vehicle can be independent of output commands to control elements of other window assemblies included in the vehicle.

Output commands 220 can include one or more sets of output commands 238 to one or more control elements of one or more sunroof assemblies, also referred to interchangeably as moonroof assemblies, included in the vehicle. Such control elements can include one or more drive motors, actuators, some combination thereof, etc. Such output commands 238 can include one or more commands to one or more control elements to control a position of the one or more sunroofs included in one or more sunroof assemblies. Output commands to control elements of one sunroof assembly included in the vehicle can be independent of output commands to control elements of other sunroof assemblies included in the vehicle.

In some embodiments, processing module 204 is configured to generate a set of output configurations which comprises a set of particular configurations of various vehicle components included in the vehicle to implement particular changes in climate conditions throughout various particular cabin regions. Such particular changes can approximate one or more optimal comfort conditions associated with the various particular cabin regions Based at least in part upon the generated set of output configurations, module 205 is configured to generate one or more sets of output commands 220 to particular control elements of particular vehicle components identified in the set of output configurations. Output commands can be generated for particular components of a given set of vehicle components, and independently of a remainder of the given set of vehicle components. For example, module 205 can generate a particular set of output commands 236 to control elements of a particular window assembly, independently of the remaining window assemblies in the vehicle, for which the module 205 may generate separate output commands, no output commands, etc. based at least in part upon the generated set of output configurations.

Figure 3:
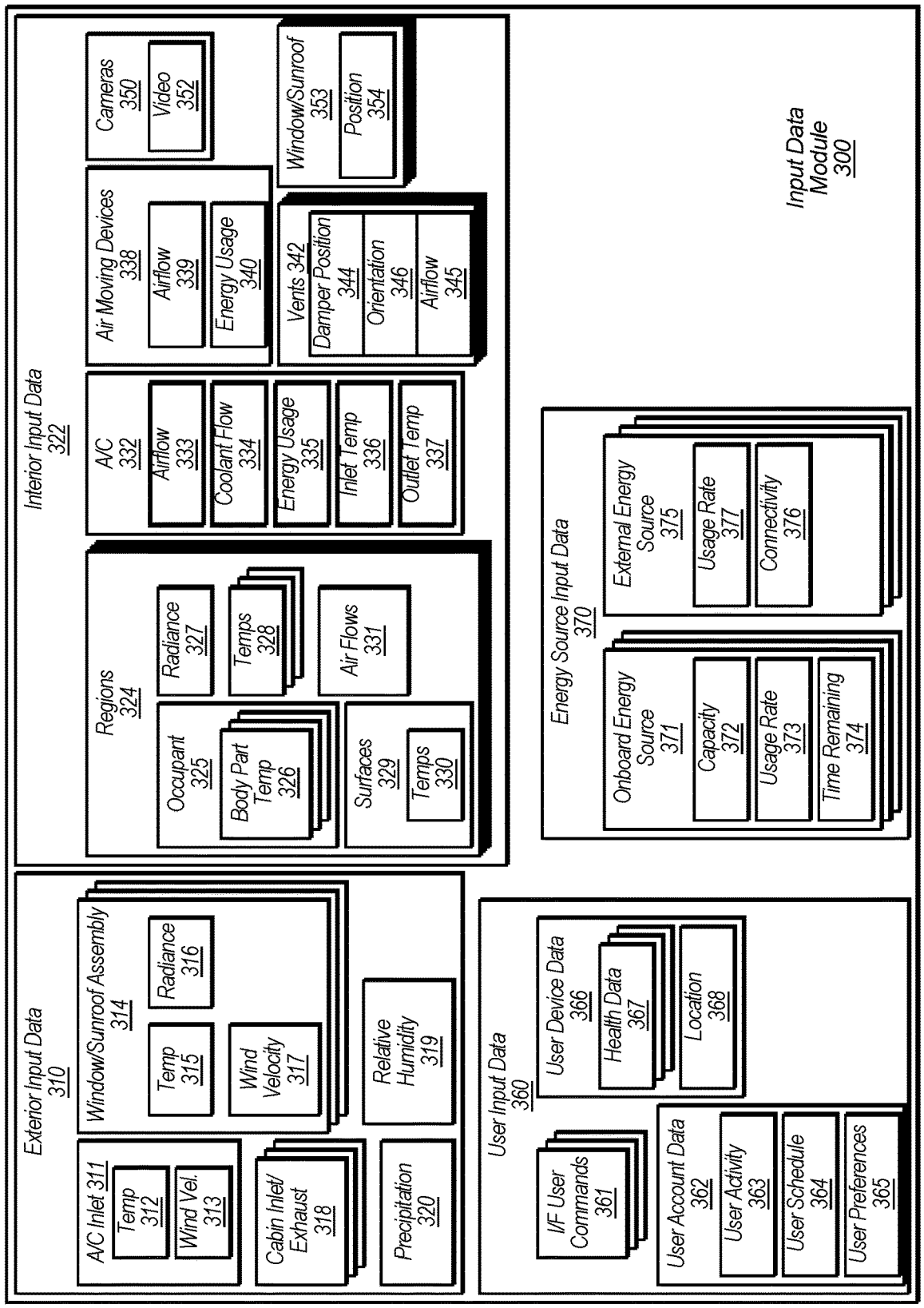
FIG. 3 illustrates a block diagram of an input data module included in a climate control system, according to some embodiments.

FIG. 3 illustrates a block diagram of an input data module included in a climate control system, according to some embodiments. The input data module 300 can be included in any of the climate control systems included in any of the embodiments illustrated herein, including as part of module 202 in climate control system 201 illustrated in FIG. 2. Input data module 300 can be implemented, in whole or in part, by one or more computer systems included in a vehicle.

Module 300 comprises various modules which are each configured to receive and at least partially process various sets of input data, from various sets of data sources, to at least partially determine one or more conditions associated with the vehicle in which the module 300 is included.

In some embodiments, module 300 comprises an exterior input data module 310 which is configured to receive and at least partially process input data from one or more various exterior sensors of the vehicle. Module 310 can receive ACU inlet data 311 associated with one or more air inlets from an exterior environment to one or more ACUs included in the vehicle. Such inlet data 311 can include data, from one or more exterior sensors, indicating a temperature 312 associated with air passing into the ACU inlet, a wind velocity 313 of such air passing into the ACU inlet, some combination thereof, etc. Data 311, in some embodiments, includes data indicating one or more of relative humidity, wet bulb temperature, etc. associated with such air passing into the ACU inlet. Module 310 can receive, from one or more external sensors, one or more sets of cabin air inlet data 318 associated with one or more air inlets into a cabin of the vehicle. Such data 318 can include one or more of dry bulb temperature, wet bulb temperature, relative humidity, flow rate, some combination thereof, etc. associated with air passing into the cabin from the exterior environment via the one or more air inlets. Module 310 can receive, from one or more external sensors, one or more sets of precipitation data 320 associated with precipitation in the external environment. Such data can include data indicating the presence of one or more particular types of precipitation (e.g., rain, hail, sleet, snow, etc.), a flow rate of such types of precipitation, some combination thereof, etc. Module 310 can receive, from one or more external sensors, one or more sets of humidity data 319 indicating relative humidity in the external environment. Module 310 can receive, from one or more external sensors, one or more sets of window and sunroof assembly data 314 indicating, for each of one or more window assemblies, sunroof assemblies, etc. included in a vehicle, one or more of temperature data 315 indicating a proximate external environment dry bulb temperature, radiance data 316 indicating solar radiance at the respective window or sunroof, wind velocity 317 proximate to the respective window or sunroof, some combination thereof, etc. Based at least in part upon the one or more instances of data received at module 310, module 310 can determine one or more characteristics of the external environment proximate to various particular portions of the vehicle (e.g., particular air inlets, air exhausts, windows, sunroofs, etc.).

In some embodiments, module 300 comprises an interior input data module 322 which is configured to receive and at least partially process input data from one or more various internal sensors of the vehicle. In some embodiments, module 322 is configured to receive sets 324 of data associated with one or more particular cabin regions included in the vehicle, sets 332 of data associated with one or more particular ACUs included in the vehicle, sets 338 of data associated with one or more particular air moving devices included in the vehicle, sets 342 of data associated with one or more particular air vents included in the vehicle, sets 350 of data associated with one or more particular camera devices included in the vehicle, and sets 353 of data associated with one or more windows, sunroofs, etc. included in the vehicle.

In some embodiments, a given set 324 of data is associated with a particular cabin region of a cabin of the vehicle. The set 324 includes various data associated with various characteristics of the particular cabin region. In some embodiments, a set 324 includes data 325 associated with one or more occupants presently in the region. Such data can indicate whether one or more particular occupants are present in the given region, how many occupants are present, identify each occupant based at least in part upon one or more user accounts, etc. In some embodiments, for each occupant identified in the given region, data 325 includes one or more sets 326 of body part data associated with the particular occupant. Such body part data can indicate, for each of various body parts of the occupant, a location of the body part within one or more potions of the given cabin region, one or more surface temperatures of the body part, an indication of whether the body part is exposed to the environment or covered by one or more instances of clothing, some combination thereof, etc. In some embodiments, a set 324 includes data 329 associated with one or more cabin surfaces which are located in the region. Such surfaces can include armrest surfaces, dashboard surfaces, door sill surfaces, chair headrest surfaces, chair backrest surfaces, chair seat surfaces, some combination thereof, etc. For one or more particular cabin surfaces (e.g., armrest surfaces, steering wheel surfaces, cabin door surfaces, dashboard surfaces, seat surfaces, etc.), data 329 can include an indication 330 of one or more surface temperatures of the particular surfaces. In some embodiments, a set 324 includes data 327 indicating solar radiance in one or more portions of the given region. In some embodiments, a set 324 includes one or more sets 328 of temperature data which indicate, for one or more particular portions of the given region, a temperature associated with the particular portion. In some embodiments, a set 324 includes one or more sets 331 of airflow data indicating one or more airflows through the region. Such sets 331 of data can identify, for one or more airflows through the given region, a direction and pathway of the airflow, a mass flow rate of the airflow, a volumetric flow rate of the airflow, a velocity of the airflow, some combination thereof, etc.

In some embodiments, module 300 is configured to determine, based at least in pat upon various sets 324 of data associated with various particular cabin regions, one or more present climate conditions through the various particular cabin regions, occupancy of particular cabin regions by one or more particular occupants, present conditions of various body parts of occupants in one or more of the particular cabin regions, etc.

In some embodiments, one or more sets 332 of data associated with one or more particular ACUs included in the vehicle comprises various sets of data indicating, for each of the one or more ACUs, various characteristics associated with the respective ACU included in the vehicle, including airflow data 333 indicating one or more of mass flow rate, volumetric flow rate, flow velocity, some combination thereof, etc. regarding air flow through the respective ACU, coolant flow data 334 indicating one or more of mass flow rate, volumetric flow rate, flow velocity, some combination thereof, etc. regarding coolant flow through one or more portions of the respective ACU, energy usage data 335 indicating one or more of present energy usage by the ACU, projected energy usage associated with one or more operating levels of the ACU, projected energy usage associated with one or more magnitudes of heat transfer between the ACU and air flowing through the ACU, some combination thereof, etc., inlet temperature data 336 and outlet temperature data 337 indicating respective temperatures of air entering and exiting the respective ACU, some combination thereof, or the like.

As used herein, energy usage by a vehicle component can refer to consumption of electrical power by one or more control elements associated with the component, including actuators, drive motors, engines, valves, pumps, etc.

In some embodiments, one or more sets 338 of data associated with one or more particular air moving devices included in the vehicle can include various sets of data indicating, for each of the one or more air moving devices included in the vehicle, various characteristics associated with the respective air moving device, including airflow data 339 indicating one or more of mass flow rate, volumetric flow rate, flow velocity, some combination thereof, etc. regarding air flow through the respective air moving device, energy usage data 340 indicating one or more of present energy usage by the air moving device, projected energy usage associated with one or more operating levels of the air moving device, projected energy usage associated with inducing one or more air flow rates through the air moving device, some combination thereof, etc.

In some embodiments, one or more sets 342 of data associated with one or more particular cabin air vents included in the vehicle can include various sets of data indicating, for each of the one or more cabin air vents included in the vehicle, damper position data 344 indicating a particular adjustment position of a damper included in the air vent, airflow data 345 indicating one or more of mass flow rate, volumetric flow rate, flow velocity, some combination thereof, etc. regarding air flow through the respective air vent, orientation data 346 indicating a particular orientation of the cabin air vent relative to one or more portions of the vehicle, including one or more surfaces included in one or more particular cabin regions, some combination thereof, or the like.

In some embodiments, one or more sets 350 of data associated with one or more particular camera devices included in the vehicle includes, for each camera device, one or more sets of image data 352 indicating one or more images of one or more portions of the vehicle cabin, including images of one or more portions of one or more particular cabin regions. Where the camera device is configured to generate videos, such image data can include video data. Image data 352 can include images in various wavelength ranges, including infrared wavelengths. At least some sets 350 of data can be associated with one or more portions of one or more occupants; for example, some image data can be associated with particular body parts of particular occupants, including data indicating whether certain body parts are exposed or covered, body temperatures associated with particular body parts, etc.

In some embodiments, one or more sets 353 of data associated with one or more window assemblies, sunroof assemblies, etc. included in the vehicle includes, for each window assembly, sunroof assembly, etc., one or more sets of position data 354 indicating a present position of the respective window or sunroof, relative to a fully opened or fully closed position. Such data 354 can be indicated by a present position of one or more elements of the window assembly, including one or more motors, actuators, etc.

Based at least in part upon the various sets of data 324, 332, 338, 342, 350, 353, module 322 is configured to determine a present state of various portions of the vehicle, including present climate conditions in various cabin regions, present conditions of various occupants and body parts thereof, present configurations, states, etc. associated with various vehicle components, some combination thereof, etc.

In some embodiments, module 300 comprises a user input data module 360 which is configured to receive and at least partially process input data associated with one or more users, which can include present occupants of the vehicle, individuals presently external to the vehicle, some combination thereof, etc.

In some embodiments, module 360 is configured to receive sets 361 of data associated with one or more particular user commands, sets 362 of data associated with one or more user accounts associated with one or more users, sets 366 of data associated with one or more user devices, some combination thereof, etc.

One or more of the sets 361 of user command data can be received from various user interfaces, including interfaces included in one or more surfaces of the vehicle cabin, one or more interfaces including in one or more user devices supporting the user and in communication with module 300 via one or more communication networks, etc. User commands can include commands to generate output commands, to certain elements of certain vehicle components, to execute particular adjustments to said vehicle components. In some embodiments, where the user is an occupant in one or more particular cabin regions of the vehicle, user commands can include specifications of one or more desired climate conditions associated one or more particular cabin regions, occupants, users, some combination thereof, etc.

One or more of the sets 362 of user account data can be received from one or more network services communicatively coupled with module 300 via one or more communication networks. In some embodiments, user account data is generated and stored locally to module 300 based at least in part upon user command data 361 received via one or more user interfaces associated with the vehicle, one or more user interfaces of one or more user devices communicatively coupled with module 300, some combination thereof, etc. In some embodiments, one or more sets 362 of data includes user activity data 363, which can include data indicating present activities of a user, recent activities of the user (e.g., activities performed within a certain historical period of time), one or more historical activity patterns associated with the user (e.g., an indication that the user historically enters the vehicle, and occupies a particular cabin region, during a time period ranging between 9:30 am and 10:00 am every Monday, Wednesday, and Friday). User activity data can include indications of particular user interactions (e.g., purchases of one or more particular goods or services via user interaction with one or more user devices, purchases via utilization of one or more user accounts, etc.). In some embodiments, one or more sets 362 of data includes user schedule data 364 which can include one or more activity schedules associated with the user account (e.g., scheduled meetings, activities, etc.). User schedule data 364 can include data indicating a particular physical location associated with one or more scheduled activities (e.g., a particular address, landmark, structure, etc.). In some embodiments, one or more sets 362 of data includes user preference data 365 which can include one or more user preferences associated with output configurations of various vehicle components, optimal comfort conditions of one or more cabin regions, etc. For example, user preference data 365 can include an indication that, for a particular user, an optimal comfort condition includes a preferred upper limit on air flow velocity through the cabin region occupied by the user.

One or more of the sets 366 of user device data can be received from one or more user devices supporting one or more users associated with one or more particular user accounts. Such user devices can include user devices communicatively coupled with at least module 300 via a communication network. Such user devices can include user devices determined to be located within the cabin of the vehicle, user devices determined to be external to the vehicle and located within a certain physical proximity of the vehicle, user devices determined to be associated with one or more particular users associated with the vehicle, some combination thereof, etc. In some embodiments, one or more sets of user device data 366 can include a set of data associated with a particular user, where the set of data includes data received from one or more user devices associated with the particular user. In some embodiments, one or more sets of user device data 366 include user health data 367 associated with a user supported by one or more user devices. The user health data can include data presently generated by one or more sensor devices included in one or more user devices. User health data 367 can include historical and present health data associated with the user, including current body temperature, pulse, blood pressure, heart rate, historical trends associated with one or more thereof, etc. In some embodiments, one or more sets of user device data 366 include location data 368 associated with one or more user devices 368. Such location data can be used to determine an approximate location of one or more users supported by the user devices; such one or more users can be identified based at least in part upon a determination that the one or more user devices are associated with the one or more users. Location data 368 can include data received from a user device, data generated based at least in part upon monitoring of signals from the user device, etc.

In some embodiments, module 300 comprises an energy source input data module 370 which is configured to receive and at least partially process input data associated with one or more energy sources, which can include one or more onboard energy sources included in the vehicle, one or more external energy sources which are located external to the vehicle, some combination thereof, etc.

In some embodiments, module 370 is configured to receive sets 371 of data associated with one or more onboard energy sources, sets 375 of data associated with one or more external energy sources, some combination thereof, etc.

One or more of the sets 371 of data associated with one or more onboard energy sources can be received from one or more onboard energy sources configured to provide energy to one or more vehicle components. Such onboard energy sources can include one or more sets of electrical power storage systems (e.g., batteries), one or more onboard solar power generator systems, one or more onboard wind power generator systems, one or more engines, some combination thereof, etc. In some embodiments, a set 371 of data is associated with one or more particular energy sources. Such a set 371 of data can include, for one or more onboard energy sources, data 372 indicating an energy capacity of the energy source. Such data 372 can include indications of an energy storage capacity of the energy source, a present quantity of energy stored at the energy source, a present proportion of the full storage capacity that is presently stored at the energy source, one or more rates of energy which the energy source is configured to distribute, etc. A set of data 371, in some embodiments, can include data 373 indicating a rate at which an energy source distributes energy. Such data 373 can include data indicating a maximum rate of energy distribution, a present rate of energy distribution, etc. In some embodiments, a set 371 of data includes data 374 indicating a projected amount of time remaining until the present capacity of the energy source is projected to be depleted, based at least in part upon capacity and distribution rates of the energy source. Such an indicated projection of time can be based upon actual present capacity and distribution rates of the energy source, one or more projections of capacity and distribution rates, some combination thereof, etc.

One or more of the sets 375 of data associated with one or more external energy sources can be received from one or more external energy sources configured to provide energy to one or more vehicle components via one or more connections included in the vehicle, one or more of the connections, etc. Such external energy sources can include one or more sets of electrical power systems (e.g., a utility power connection). In some embodiments, a set 375 of data is associated with one or more particular energy sources. Such a set 375 of data can include, for one or more external energy sources, data 376 indicating whether the vehicle is presently connected to the energy source, such that one or more vehicle components can presently receive energy from the external energy source. Such data 375 can include indications received from a connection of the vehicle indicating whether or not the connection is presently engaged with an external energy source connection, whether energy is available via the engaged connection, etc. A set of data 375, in some embodiments, can include data 377 indicating a rate at which an external energy source can distribute energy to one or more vehicle components via one or more connections included in the vehicle. Such a rate can be based at least in part upon an energy flowrate capacity associated with the vehicle energy connection, an energy flowrate capacity associated with the energy source, some combination thereof, etc.

Figure 4:
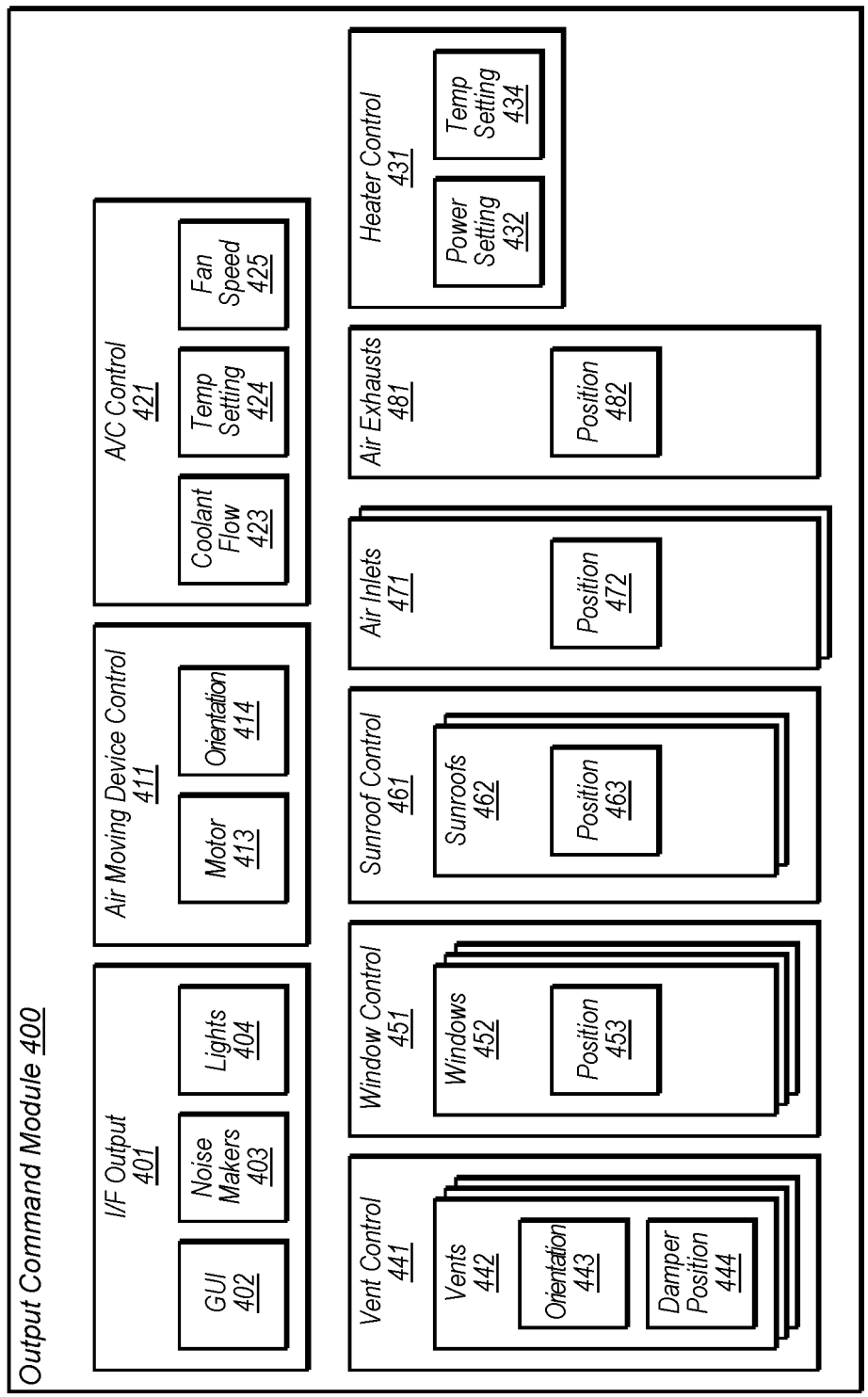
FIG. 4 illustrates a block diagram of an output command module included in a climate control system, according to some embodiments.

FIG. 4 illustrates a block diagram of an output command module included in a climate control system, according to some embodiments. The output command module 400 can be included in any of the climate control systems included in any of the embodiments illustrated herein, including as part of module 205 in climate control system 201 illustrated in FIG. 2. Output command module 400 can be implemented, in whole or in part, by one or more computer systems included in a vehicle.

Module 400 comprises various modules which are each configured to generate one or more sets of output commands, to one or more elements of one or more various vehicle components, to adjust one or more aspects of the one or more various vehicle components, thereby, as a result, changing climate conditions in one or more portions of one or more cabin regions in the vehicle in which the module 400 is included.

In some embodiments, module 400 comprises an interface output module 401 which is configured to generate one or more sets of output commands, for communication to one or more vehicle components, to present one or more indications to one or more users, cabin occupants, etc. In some embodiments, one or more of such output commands 401 can include particular interfaces 402, including one or more graphical user interfaces (GUI), for display by one or more user interfaces. A GUI can include various icons, graphical representations, etc. which can provide information to an occupant regarding operation of the climate control system, climate conditions in various cabin regions, occupancy of various regions, etc. Some elements of a GUI, including various icons, graphical representations, etc. can be at least partially interactive and can be configured to indicate, to module 202, one or more particular user commands based at least in part upon user interaction with the various icons, graphical representations, etc. In some embodiments, one or more of such output commands 401 can include commands 403 to one or more noisemaking devices to generate one or more particular levels of noise. In some embodiments, one or more of such output commands 401 can include commands 404 to one or more light-emitting devices, including one or more sets of cabin lights, to activate in one or more particular lighting patterns. Such graphical user interfaces, noise generation and light activation can indicate, to an occupant of the vehicle, that output commands are being generated to change the climate conditions in one or more cabin regions.

In some embodiments, module 400 comprises an air moving device control module 411 which is configured to generate one or more sets of output commands, for communication to one or more air moving devices included in the vehicle, to adjustably control one or more characteristics of airflow induced by the various air moving devices. In some embodiments, output commands generated at module 411 include one or more sets 412 of output commands generated for separate air moving devices. Sets 412 of output commands generated for separate air moving devices can be generated independently. In some embodiments, one or more sets 412 of output commands to one or more air moving devices includes one or more commands 413 to one or more drive motors associated with the one or more air moving devices. Such commands can command the drive motors to operate at one or more particular operating levels to induce one or more particular airflow rates, flow velocities, etc. In some embodiments, commands 413 include one or more commands to a drive motor to operate at a particular motor speed. In some embodiments, one or more sets 412 of output commands to one or more air moving devices includes one or more commands 414 to one or more actuators, etc. associated with the one or more air moving devices. Such commands can command the actuators to adjust an orientation of the one or more air moving devices, so that airflow induced by the one or more air moving devices is directed in one or more particular directions.

In some embodiments, module 400 comprises an air conditioning unit (ACU) control module 421 which is configured to generate one or more sets of output commands, for communication to one or more ACUs included in the vehicle, to adjustably control one or more characteristics of conditioned airflow entering the vehicle cabin via the one or more ACUs. In some embodiments, output commands generated at module 421 include one or more sets of output commands generated for one or more control elements of separate ACUs. In some embodiments, one or more sets of output commands generated for one or more control elements of one or more separate ACUs comprises commands 423 to adjust a flowrate of one or more coolants in the one or more separate ACUs. Such commands 423 can include commands to one or more coolant pumps, valves, etc. to adjust to certain operating levels, positions, etc. to cause the particular flowrate adjustment. In some embodiments, one or more one or more sets of output commands generated for one or more elements of one or more separate ACUs comprises commands 424 to one or more ACU elements to adjust an output temperature of air exiting the ACU. Such a command can be executed by the ACU elements via one or more of adjusting of coolant flowrates, adjusting of intra-ACU air flowrates, etc. In some embodiments, one or more sets of output commands generated for one or more elements of one or more separate ACUs comprises commands 424 to one or more air moving devices associated with one or more ACUs to adjustably control one or more characteristics of airflow induced by the various air moving devices, thereby controlling airflow through the one or more ACUs.

In some embodiments, module 400 comprises heater unit control module 431 which is configured to generate one or more sets of output commands, for communication to one or more heater units included in the vehicle, to adjustably control heating of one or more airflows, surfaces, etc. In some embodiments, output commands generated at module 431 include one or more sets of output commands generated for one or more control elements of separate heater units. In some embodiments, one or more sets of output commands generated for one or more control elements of one or more separate heater units comprises commands 432 to adjust an amount of heating generated by one or more heating elements including in one or more heater units. Such commands 432 can include a command to adjust an amount of electrical power provided to one or more heating elements. In some embodiments, one or more sets of output commands generated for one or more control elements of one or more separate heater units comprises commands 434 to adjust heating by one or more heating elements to adjust a temperature of one or more surfaces, airflows, etc. to approximate a particular temperature within one or more particular margins.

In some embodiments, module 400 comprises a cabin air vent control module 441 which is configured to generate one or more sets of output commands, for communication to one or more control elements of one or more cabin air vents included in the vehicle, to adjustably control one or more characteristics of airflow through the various cabin air vents. In some embodiments, output commands generated at module 441 include one or more sets 442 of output commands generated for separate cabin air vents. Sets 442 of output commands generated for separate cabin air vents can be generated independently. In some embodiments, one or more sets 442 of output commands to one or more cabin air vents includes one or more commands 444 to one or more motors, actuators, etc. associated with the one or more cabin air vents to adjust a position of one or more dampers included in the one or more cabin air vents to adjust airflow rates through the one or more cabin air vents. In some embodiments, one or more sets 442 of output commands to one or more cabin air vents includes one or more commands 443 to one or more actuators, etc. associated with the one or more air cabin vents to adjust an orientation of the one or more cabin air vents, so that airflow induced by the one or more cabin air vents is directed in one or more particular directions through one or more particular portions of one or more particular cabin regions.

In some embodiments, module 400 comprises a window assembly control module 451 which is configured to generate one or more sets of output commands, for communication to one or more control elements of one or more window assemblies included in the vehicle, to adjustably control one or more windows to control climate conditions in one or more cabin regions. In some embodiments, output commands generated at module 451 include one or more sets 452 of output commands generated for separate window assemblies. Sets 452 of output commands generated for separate window assemblies can be generated independently. In some embodiments, one or more sets 452 of output commands to one or more window assemblies includes one or more commands 453 to one or more motors, actuators, etc. associated with the one or more window assemblies to adjust a position of windows included in the one or more window assemblies to adjust airflow through the one or more window assemblies to or from the cabin.

In some embodiments, module 400 comprises a sunroof assembly control module 461 which is configured to generate one or more sets of output commands, for communication to one or more control elements of one or more sunroof assemblies included in the vehicle, to adjustably control one or more sunroofs to control climate conditions in one or more cabin regions. In some embodiments, output commands generated at module 461 include one or more sets 462 of output commands generated for separate sunroof assemblies. Sets 462 of output commands generated for separate sunroof assemblies can be generated independently. In some embodiments, one or more sets 462 of output commands to one or more sunroof assemblies includes one or more commands 463 to one or more motors, actuators, etc. associated with the one or more sunroof assemblies to adjust a position of sunroofs included in the one or more sunroof assemblies to adjust airflow through the one or more sunroof assemblies to or from the cabin.

In some embodiments, module 400 comprises a cabin air inlet control module 471 which is configured to generate one or more sets of output commands, for communication to one or more elements of one or more cabin air inlets included in the vehicle, to adjustably control airflow through the one or more cabin air inlets into the cabin. In some embodiments, output commands generated at module 471 include one or more sets of output commands generated for cabin air inlets. Sets of output commands generated for separate cabin air inlets can be generated independently. In some embodiments, one or more sets of output commands to one or more cabin air inlets includes one or more commands 472 to one or more motors, actuators, etc. associated with the one or more cabin air inlets to adjust a position of one or more dampers included in the one or more cabin air inlets to adjust airflow through the one or more cabin air inlets.

In some embodiments, module 400 comprises a cabin air exhaust control module 481 which is configured to generate one or more sets of output commands, for communication to one or more elements of one or more cabin air exhausts included in the vehicle, to adjustably control airflow through the one or more cabin air exhausts out of the cabin. In some embodiments, output commands generated at module 481 include one or more sets of output commands generated for cabin air exhausts. Sets of output commands generated for separate cabin air exhausts can be generated independently. In some embodiments, one or more sets of output commands to one or more cabin air exhausts includes one or more commands 482 to one or more motors, actuators, etc. associated with the one or more cabin air exhausts to adjust a position of one or more dampers included in the one or more cabin air exhausts to adjust airflow through the one or more cabin air exhausts.

Figure 5:
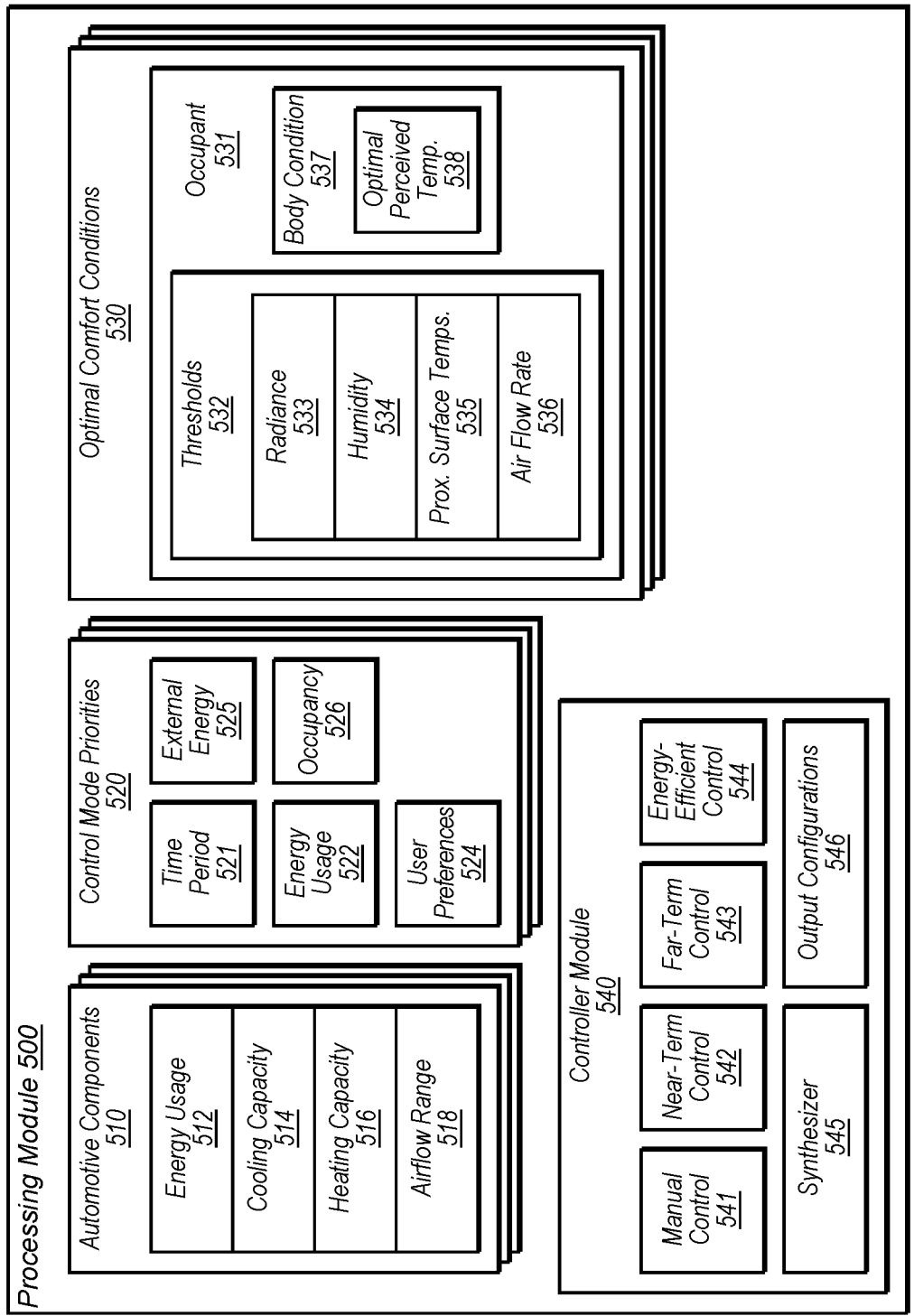
FIG. 5 illustrates a block diagram of a processing module included in a climate control system, according to some embodiments.

FIG. 5 illustrates a block diagram of a processing module included in a climate control system, according to some embodiments. The processing module 500 can be included in any of the climate control systems included in any of the embodiments illustrated herein, including as part of module 204 in climate control system 201 illustrated in FIG. 2. Processing module 500 can be implemented, in whole or in part, by one or more computer systems included in a vehicle.

In some embodiments, processing module 500 is configured to determine one or more optimal comfort conditions for one or more cabin regions and establish a set of output configurations of various vehicle components included in the vehicle to change the climate conditions in the various cabin regions therein to approximate, within at least one margin, the respective optimal comfort condition determined for the respective cabin region. Such a set of output configurations can be used by one or more output command modules included in a climate control system to generate one or more sets of output commands, to one or more vehicle components, to implement the set of output configurations.

The optimal comfort conditions and the set of output configurations can be developed based at least in part upon one or more sets of input data received at the climate control system, including data associated with one or more occupants of the one or more cabin regions.

In some embodiments, a processing module 500 comprises one or more separate modules, including a vehicle component module 510 configured to store data indicating various characteristics associated with one or more vehicle components included in a vehicle, a control mode priority module 520 configured to store, for various control modes, various sets of priorities, also referred to herein as "constraints", "weights", etc., associated with output configurations associated with the control mode, an optimal comfort module 530 configured to determine, for one or more cabin regions, a set of optimal comfort conditions for one or more portions of the cabin region, and a controller module 540 configured to establish one or more sets of output configurations associated with various control modes, including a synthesis of various control modes.

Vehicle component data module 510, in some embodiments, is configured to store various sets of operating data associated with various vehicle components included in a vehicle. Each set of operating data 510 can be associated with one or more particular vehicle components. In some embodiments, one or more sets 510 of vehicle component data includes energy usage data 512 indicating energy usage associated with operation of one or more elements of the component. In some embodiments, each set of operating data 510 includes data specific to the operational capacity of the particular component. For example, where the vehicle component is an ACU, a set of data 510 associated with the ACU can include data 514 indicating a cooling capacity of the ACU. In another example, where the vehicle component is a heater unit, the set of data 510 associated with the ACU can include data 516 indicating a heating capacity of the heater unit. In another example, where the vehicle component is an air vent, air moving device, air inlet, window assembly, sunroof assembly, etc. the set of data 510 associated with the component can include data 518 indicating an airflow capacity associated with the component. Such data 518 can include data indicating various ranges of airflow associated with various configurations of particular elements included in the component, various directions of airflow associated with various configurations of particular elements included in the component, etc.

Control mode priorities module 520 includes, for each of various control modes, a set of priorities associated with the control mode which can be utilized to generate a set of output configurations, of various vehicle components, associated with the control mode. Different control modes can include different priorities. Various control mode priorities can prioritize various characteristics of generated output configurations, including one or more of elapsed time period associated with changing cabin region climate conditions to approximate optimal comfort conditions, vehicle component energy usage, variation from optimal comfort conditions, accommodation of user preferences, utilization of external energy sources, some combination thereof, etc. Various priorities can include time period priorities 521, energy usage priorities 522, user preference priorities 524, external energy priorities 525, occupancy priorities 526, etc. For example, a near-term control mode which prioritizes minimizing the elapsed time to approximate climate conditions in a cabin region to optimal comfort conditions for the region can include a time period priority 521 which prioritizes the time period, so that a controller module 540 which generates a set of output configurations according to the near-term control mode prioritizes generating a set of output configurations which change the climate conditions in one or more cabin regions to approximate optimal comfort conditions of one or more regions within a minimal period of elapsed time, reduced period of elapsed time, etc. In another example, a far-term control mode which prioritizes minimizing the approximation of climate conditions in a cabin region to optimal comfort conditions for the region may lack time period priorities 521 and may include occupancy priorities 526 which prioritize generating output configurations which minimize climate condition margins by which the set of output conditions can approximate climate conditions to optimal comfort conditions. In another example, an energy-efficient control mode which prioritizes minimizing the usage of onboard energy sources can include energy usage priorities 522 which prioritize generating output configurations which minimize energy usage of onboard energy sources, external energy priorities which prioritize generating output configurations which maximize use of external energy sources, onboard energy sources which lack finite fuel sources, etc. In another example, a manual control mode which prioritizes generating output configurations which accommodate user preferences associated with particular users occupying particular regions can include user preference priorities 521 which prioritize generating output configurations which accommodate user preferences for vehicle component operating states (e.g., a particular airflow magnitude and direction).

Optimal comfort condition module 530, in some embodiments, is configured to determine optimal comfort conditions for one or more cabin regions. For each region, a separate optimal comfort condition associated with one or more particular occupants 531 can be determined. The optimal comfort condition for a given region can be based at least in part upon whether the region is occupied by one or more occupants, whether the region is projected to be occupied by one or more occupants within a certain period of time, user data associated with said occupants, some combination thereof, etc. An optimal comfort condition, for a given cabin region, can comprise a set of climate conditions, of various portions of the cabin regions, determined to correspond to optimized perceived comfort of one or more particular occupants 531 of one or more regions, where the one or more regions, in some embodiments, are different from the given region. The set of climate conditions included in a particular optimal comfort condition 530 can be associated with particular climate condition thresholds 532 associated with a given occupant 531 of a given region, along with various determined optimal occupant-perceptible temperatures 538, for each of various body parts of the given occupant, based at least in part upon a current body condition of the occupant. For example, an optimal perceived temperature for an occupant body part can be different based at least in part upon one or more various present health data characteristics of the occupant, including heart rate, present body temperature, etc. As used herein, "optimal perceived temperature" can be referred to as occupant-perceptible cabin region temperatures, occupant-perceived cabin region temperatures, occupant-perceived air temperatures, occupant-perceptible air temperatures, etc.

In some embodiments, for a given region, module 530 can determine an optimal comfort condition based at least in part upon a set 531 of data associated with a particular occupant within the region. Data 531 can comprise, for one or more particular body conditions 537 of the occupant, a corresponding set of occupant-perceived air temperatures 538, proximate to a corresponding set of body parts, and can include a particular temperature gradient through the given region. A body condition 537 can be associated with various input data associated with the occupant, including present body temperatures of various body parts, present user health data, etc. For example, a body condition 537 of an occupant with high body temperature and elevated heart rate can be different than a body condition 537 of an occupant with normal heart rate and normal body temperature. As a result, different optimal occupant-perceptible temperatures 538 of various body parts, and thus different comfort conditions 530, can be determined for different cabin regions based at least in part upon different body conditions 537 of occupants 531 in the different cabin regions.

The optimal comfort condition 530 determined for a given region can be based at least in part upon various threshold data 532 associated with the occupant 531 therein, including particular threshold ranges of airflow 536 in various portions of the cabin region, particular threshold ranges of surface temperatures 535 of certain surfaces included in or associated with the given region, threshold ranges 534 of relative humidity in the region, threshold ranges of radiance 533 in one or more portions of the cabin region, etc.

In some embodiments, a body condition 537 of an occupant 531 is based at least in part upon determinations regarding whether certain body parts are exposed to the cabin environment, covered by one or more instances of clothing, etc. For example, where an occupant is determined, based at least in part upon input data, to have arms which are exposed, the arms of the occupant can be determined to be more sensitive to airflow impingement than if the arms were covered by clothing. As a result, the optimal occupant-perceptible temperature 538 for various body parts of the occupant 531 can be different based at least in part upon how exposed the various body parts are to the cabin region environment. In addition, an optimal comfort condition 530 determined for the cabin region in which the occupant 531 is located can include different thresholds 532 based at least in part upon different body conditions 537 of the occupant 531. For example, airflow thresholds 536, with regard to the portions of a cabin region in which an occupant's arms are located, can be different based at least in part upon whether the occupant's arms are exposed or covered by one or more instances of clothing, which can result in determination of different optimal comfort conditions 530 based at least in part upon differing threshold 532, body conditions 537, occupant-perceptible temperatures 538, etc. associated with different determinations of exposure with regard to various occupant body parts.

In some embodiments, optimal comfort module 530 is configured to determine an optimal comfort condition for an unoccupied cabin region, where the optimal comfort condition for the unoccupied region can be associated with a comfort condition of one or more other occupied cabin regions. For example, an unoccupied cabin region which is adjacent to an occupied region may be associated, by module 530, with the occupied cabin region as a heat sink area, airflow bypass region, etc. As a result, the optimal comfort condition for the unoccupied region may have a temperature gradient which includes environmental conditions beyond the optimal comfort conditions of the occupied region, and can lack threshold ranges 532 associated with the user occupying the occupied region. For example, module 530 can develop, for an unoccupied cabin region, an optimal comfort condition based at least in part upon an infinite airflow threshold range 536, etc. In some embodiments, the thresholds 532 included in an optimal comfort condition of an unoccupied cabin region are associated with a proximity, location, etc. of the unoccupied cabin region to an occupied cabin region. For example, module 530 can generate, for an unoccupied cabin region which is adjacent to an occupied cabin region, an optimal comfort condition with more restrictive airflow threshold ranges than another unoccupied region which is not adjacent to the occupied region, so that airflow through the adjacent region does not disturb the occupant(s) in the occupied region.

Controller module 540 is configured to generate one or more sets of output configurations 546, according to one or more control modes 541-544, for the various cabin regions included in a vehicle, based at least in part upon determined optimal comfort conditions for the various cabin regions, various control mode priorities, and data associated with various vehicle components included in the vehicle. Controller module 540 can select a set of output configurations generated according to one or more particular control modes 541-544, generate a set of output configurations based at least in part upon a synthesis 545 of two or more control modes, some combination thereof, etc.

Module 540 is configured to generate one or more sets of output configurations for each of the various cabin regions in a vehicle to implement the determined optimal comfort conditions 530 for the given region. A set of output configurations, for a given region, can comprise a set operating states, physical adjustments, operational configurations, etc. of one or more particular vehicle components, including particular coolant flowrates and air moving device operating levels for one or more ACU components, particular damper positions and orientations of one or more particular air vents, positions of one or more windows, positions of one or more sunroofs, some combination thereof, etc. A set of output configurations 546 can include separate configurations of each individual vehicle component, where the configurations change over time according to various control algorithms, so that the operating state, physical configuration, etc. of the vehicle component changes over time. For example, a set of output configurations can include a configuration of an ACU fan to operate at maximum operating level for a first period of time, progressively reduce operating level during a subsequent second period of time, and operate at a particular reduced operating level during a subsequent third period of time. Determination of an output configuration to implement an optimal comfort condition in one region can include consideration of optimal comfort conditions 530 in other regions, output configurations 546 to implement the optimal comfort conditions in the other regions, some combination thereof, etc.

In some embodiments, module 540 is configured to generate multiple separate sets of output configurations are determined for each region, wherein each set of output configurations is determined according to different control modes 541-544, where a set of output configurations determined according to a particular mode are determined based at least in part upon a set of control mode priorities 520 associated with the given control mode. For example, near-term control mode module 542 is configured to generate, for one or more cabin regions, a set of output configurations, referred to herein as a "near-term" set of output configurations, based at least in part upon a set of near-term control mode priorities 520 which prioritize minimizing 521 the amount of elapsed time required for the output configuration to minimize the difference between the climate condition in the associated region to reach and the optimal comfort condition for that region. In another example, far-term control mode module 543 is configured to generate, for one or more cabin regions, a set of output configurations, referred to herein as a "far-term" set of output configurations, based at least in part upon a set of far-term control mode priorities 520 which lack priorities 521 which would prioritize minimizing the amount of elapsed time needed to minimize the difference between the climate condition and the optimal comfort condition. In another example, energy-efficient control mode module 544 is configured to generate, for one or more cabin regions, a set of output configurations, referred to herein as a "energy-efficient" set of output configurations, based at least in part upon a set of energy-efficient control mode priorities 520 which prioritize minimizing 522 energy usage by the various vehicle components controlled to control the climate condition in the given region. In another example, manual control mode module 541 is configured to generate, for one or more cabin regions, a set of output configurations, referred to herein as a "manual" set of output configurations, based at least in part upon a set of manual control mode priorities 520 which prioritize user preferences 524 of one or more users occupying 526 a given region.

In some embodiments, controller module 540 comprises a synthesizer module 545 configured to generate a set of output configurations, for one or more cabin regions, based at least in part upon a synthesis of at least two separate sets of output configurations generated according to two or more separate control modes 541-544. For example, for a given region, synthesis module 545 can synthesize a near-term set of output configurations 546 generated by module 542, with a far-term set of output configurations 546 generated by module 543, to generate a synthesis set of output configurations. Such a synthesis set of output configurations can include output configurations, of various vehicle components, which balance priorities 520 of the synthesized control modes. For example, synthesis module 545 can be configured to generate a synthesis set of output configurations, based at least in part upon two or more separate control mode sets of output configurations generated according to two or more separate control modes, by including, from each separate control mode sets of output configurations, output configurations which do not interfere with the priorities 520 of the other control mode sets of output configurations. Where output configurations associated with separate control modes interfere, synthesis module 545 is configured to generate output configurations which balance the different priorities of the different control modes being synthesized.

In some embodiments, synthesis module 545, rather than synthesizing separate sets of output configurations generated according to separate control modules, generates a set of output configurations according to a selected set of control modes priorities 520. The set of control mode priorities 520 can be selected, by at least module 540, based at least in part upon one or more determined priorities. The selected set of control mode priorities can be synthesized into a single set of control mode priorities, and module 545 can generate a set of output configurations according to the synthesized set of control mode priorities.

Figure 6:
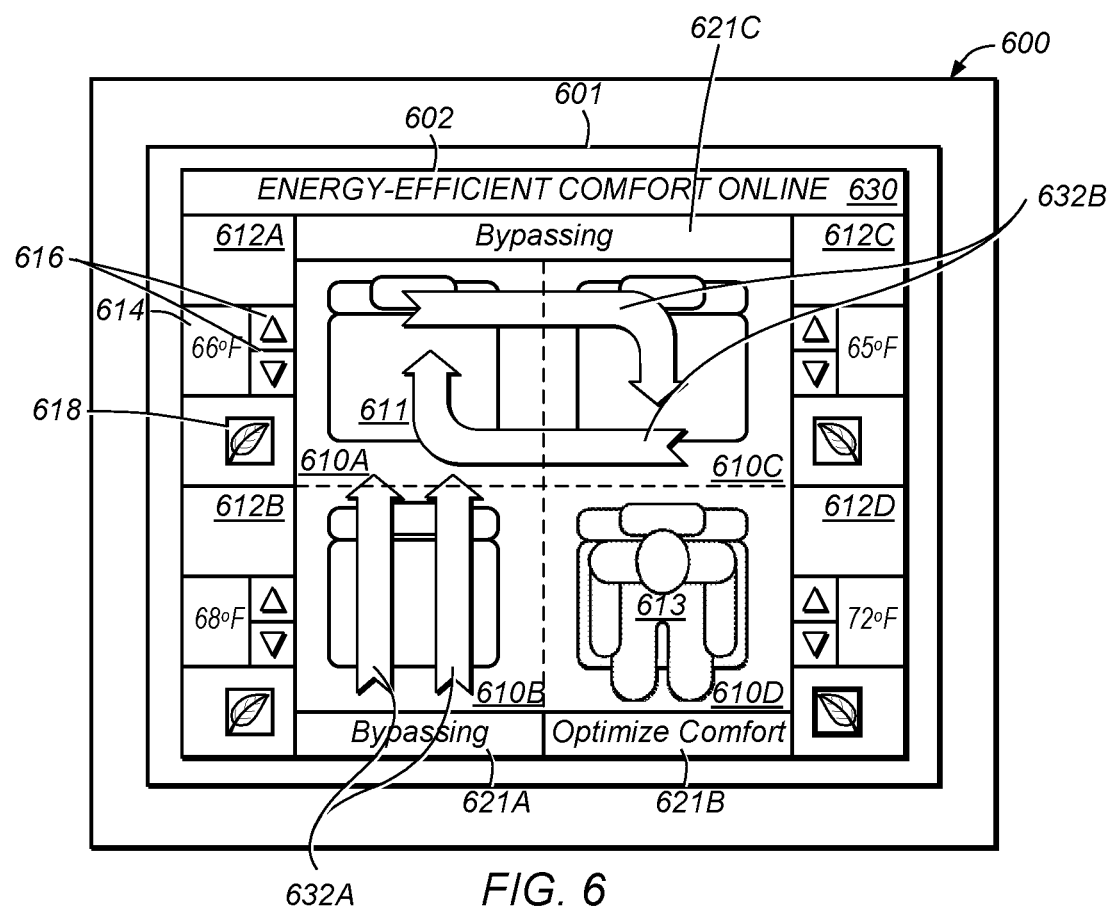
FIG. 6 illustrates a graphical user interface which provides graphical representations associated with the climate control system, according to some embodiments.

FIG. 6 illustrates a graphical display interface which provides graphical representations associated with the climate control system, according to some embodiments. The graphical display interface can be generated based at least in part upon one or more output commands generated by one or more modules of a climate control system, including the climate control system 201 illustrated in FIG. 2. Graphical display interface 602 can be displayed in one or more display interfaces 600 which are implemented, in whole or in part, by one or more computer systems included in a vehicle.

Display interface 600 can be included in one or more portions of a vehicle, including one or more surfaces included in one or more cabin regions of the vehicle cabin. For example, display interface 600 can be included in a dashboard surface included in the vehicle cabin. In some embodiments, display interface includes one of more display screens 601 which can include one or more graphical user interfaces 602 associated with the climate control system included in the vehicle.

In some embodiments, interface 602 presents graphical representations 610A-D associated with various cabin regions. As shown in the illustrated embodiment, representations 610A-D of separate regions of a vehicle cabin, where each region includes a separate seat and one particular region is presently occupied, display representations of the respective seats 611 included in the separate regions and, for the region 610D which is occupied, display a graphical representation 613 of the occupant in the graphical representation 610D of the respective region. Such graphical representations can indicate, to one or more users, that the climate control system has identified particular occupied and unoccupied cabin regions and is establishing sets of output configurations accordingly.

In some embodiments, interface 602 includes one or more sets 612A-D of icons associated with each of the various cabin regions. Such sets of icons can include graphical representations 614 of one or more climate condition characteristics associated with the respective cabin region. Such characteristics, as shown in the illustrated embodiment, can include a dry bulb temperature associated with the respective region. It will be understood that various other characteristics can be indicated in a set 612 of icons, including graphical representations of gradients of one or more of temperature, airflow, humidity, etc. associated with various portions of the respective cabin region.

In some embodiments, icons 612 can include one or more interactive icons, graphical representations with which a user can interact to provide one or more user commands to a climate control system. In the illustrated embodiment, for example, each set 612 of icons associated with a given cabin region 610 includes temperature control icons 616 with which a user can interact to provide user commands to a climate control system indicating a desired dry bulb temperature for the respective region 610. In addition, each set 612 of icons includes an energy-efficiency icon 618 with which a user can interact to generate user commands, to the climate control system, to establish output configurations which at least partially optimize energy usage in controlling climate conditions in at least one cabin region. In the illustrated embodiment, icon 618 associated with region 610D is activated, indicating that energy usage optimization (also referred to herein as energy efficiency) is presently being at least partially optimized by the climate control system in establishing a set of output configurations to control climate conditions in at least region 610D. In some embodiments, climate control system responds to a user command to optimize energy usage with respect to at least one cabin region, based at least in part upon user interaction with one or more icons 618, by optimizing energy usage with respect to at least one other cabin region. For example, in response to receiving a user command to optimize energy usage with respect to controlling climate conditions in 610D, a climate control system can optimize energy usage with respect to controlling climate conditions in all regions 610A-D. In some embodiments, interface 602 displays an indicator 630 indicating that the climate control system is presently establishing output configurations which result in a control of climate conditions in one or more cabin regions which at least partially optimizes energy usage.

In some embodiments, interface 602 includes one or more graphical representations of climate control system output commands, output configurations, etc. Such representations can provide indication to a user that the climate control system is presently engaged in establishing one or more sets of output configurations according to certain settings, weights, limiters, etc., (also referred to herein as "priorities") is presently generating output commands to control certain vehicle components to execute particular changes in climate conditions in certain cabin regions, etc. Such representations can include indications of one or more characteristics of output configurations for each of various cabin regions, indications of output commands to various particular vehicle components, etc.

For example, in the illustrated embodiment of FIG. 6, interface 602 includes, for one or more cabin region representations 610A-D, one or more indicators 621A-C of the output configuration established with respect to one or more cabin regions. Indicator 621B indicates that the climate control system has established, for region 610D, a set of output configurations which are configured to change the climate conditions in region 610D to at least approximate an optimal comfort condition which optimizes comfort of the occupant 613 of the region 610, while indicators 621A and 621C indicate that the climate control system has established sets of output configurations associated with regions 610A-C which at least partially facilitate control of climate conditions in occupied regions (e.g., region 610D) at the expense of vehicle component operating thresholds (e.g., airflow velocity thresholds, radiance thresholds, etc.) that would otherwise be present if the region were occupied. In the illustrated embodiment, such indicators 621A, 621C indicate that the climate control system is controlling regions 610A-C in a "bypass" state, indicating that climate is being controlled in regions 610A-C to facilitate comfort optimization in other regions (i.e. 610D) at the expense of conditions in those regions 610A-C.

In another example, in the illustrated embodiment of FIG. 6, interface 602 includes, for various cabin regions, indicators 632A-C of airflow through one or more regions 610A-C. Such indicators can indicate flow direction, flowrate, temperature, etc. For example, in the illustrated embodiment, indicators 632A indicate that airflow is being directed from a front of region 610C back towards the seat included in that region, and beyond to the region 610A behind region 610C. In addition, indicators 632B indicate that airflow is being circulated through and between regions 610A-B. The length of the arrow indicator can indicate the magnitude (e.g., mass flow rate, volumetric flow rate, flow velocity, etc.) of the airflow). In some embodiments, the airflow indicators can be of a color associated with the temperature of the airflow. For example, an airflow which has been heated by one or more heater units can be represented by an airflow indicator 632 which is colored a red shade, while an airflow which has been cooled by one or more ACUs can be represented by an airflow indicator 632 which is colored a blue shade, etc.

Methods of Vehicle Climate Control

Figure 7:
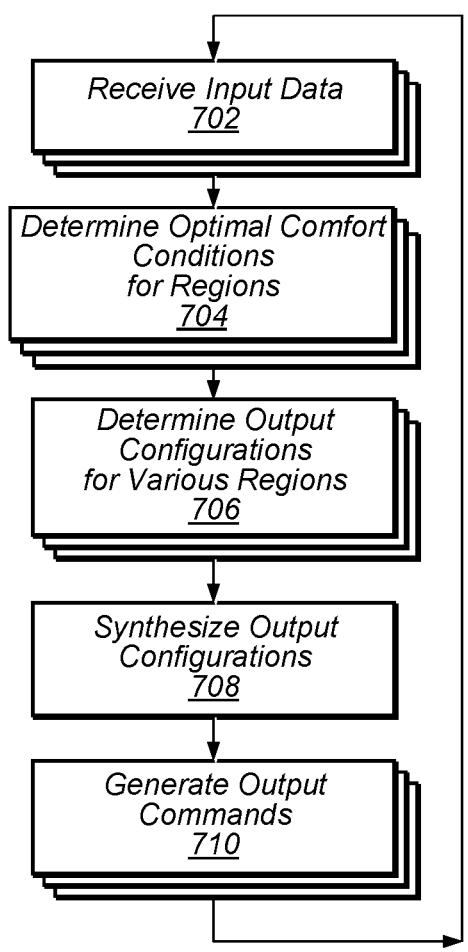
FIG. 7 is a flowchart of a method for controlling climate conditions in various cabin regions of a vehicle cabin, according to some embodiments.

FIG. 7 is a flowchart of a method for controlling climate conditions in various cabin regions of a vehicle cabin, according to some embodiments. The method can be implemented by one or more of the climate control systems illustrated in the above figures.

At 702, input data is received from one or more input data sources. Such input data sources can include one or more various internal environmental sensors, external environmental sensors, user devices, remote computer systems, user commands received via one or more vehicle interfaces, some combination thereof, or the like. Such input data can include sensor data indicating cabin region occupancy, cabin region occupant body part conditions, air temperature, radiance, relative humidity, some combination thereof, etc. at one or more particular portions of one or more particular cabin regions, at one or more vehicle air inlets, at one or more locations at the exterior of the vehicle, etc. Such input data can include user data indicating one or more of user climate condition preferences, user health data, present user activities, historical user activity patterns, user activity schedules, user device location relative to the vehicle, some combination thereof, or the like associated with one or more particular users. Such input data can include energy usage data associated with various vehicle components and energy sources, including onboard energy sources including batteries, generators, engines, fuel sources, external energy sources, some combination thereof, etc. Based at least in part upon receiving such input data, the climate control system can determine a past state, present state, projected future state, etc. associated with one or more users, occupants, cabin regions, etc.

At 704, optimal comfort conditions are determined for one or more cabin regions. For each region, a separate comfort condition can be determined. The optimal comfort condition for a given region can be based at least in part upon whether the region is occupied by one or more occupants, whether the region is anticipated to be occupied by one or more occupants within a certain period of time, user data associated with said occupants, some combination thereof, etc. In some embodiments, for a given region, an optimal comfort condition comprises a set of occupant-perceptible air temperatures, proximate to corresponding sets of body parts of said occupant, and can include a particular temperature gradient through the given region. The optimal comfort condition can include particular threshold ranges of airflow velocity, mass flow rate, volumetric flow rate, some combination thereof, particular threshold ranges of surface temperatures of certain surfaces included in or associated with the given region, threshold ranges of relative humidity in the region, etc.

Where a cabin region is unoccupied, an optimal comfort condition for the region can be associated with a comfort condition of one or more other regions which are occupied. For example, an unoccupied cabin region which is adjacent to an occupied region may be associated with the occupied cabin region as a heat sink area, airflow bypass region, etc. As a result, the optimal comfort condition for the unoccupied region may have a temperature gradient which includes environmental conditions beyond the optimal comfort conditions of the occupied region, and can lack threshold ranges. For example, an unoccupied cabin region may have an optimal comfort condition which lacks airflow thresholds, an infinite airflow threshold range, etc. In some embodiments, the thresholds included in an optimal comfort condition of an unoccupied cabin region are associated with a proximity, location, etc. of the unoccupied cabin region to an occupied cabin region. For example, an unoccupied cabin region which is adjacent to an occupied cabin region can have an optimal comfort condition with more restrictive airflow threshold ranges than another unoccupied region which is not adjacent to the occupied region, so that airflow through the adjacent region does not disturb the occupant(s) in the occupied region.

At 706, one or more sets of output configurations are determined for the various cabin regions to implement the determined optimal comfort conditions of the various regions. A set of output configurations, for a given region, can comprise a set of configurations of one or more particular vehicle components, including particular coolant flowrates and air moving device operating levels for one or more ACU components, particular damper positions and orientations of one or more particular air vents, positions of one or more windows, positions of one or more sunroofs, some combination thereof, etc. which implement particular changes to climate conditions in various cabin regions. A set of output configurations can include separate sets of configurations of each individual vehicle component, where the configurations change over time according to various control algorithms, so that the operating state of the vehicle component changes over time. For example, a set of output configurations can include a set of configurations of an ACU fan, where the set of configurations includes a configuration of operating at maximum operating level for a first period of time, progressively reducing operating levels during a subsequent second period of time, and operating at a reduced operating level during a subsequent third period of time. Determination of an output configuration to implement an optimal comfort condition in one region can include consideration of optimal comfort conditions in other regions, output configurations to implement the optimal comfort conditions in the other regions, some combination thereof, etc.

In some embodiments, multiple separate sets of output configurations are determined for each region, wherein each set of output configurations is determined according to different control mode priorities. For example, one set of output configurations generated according to a near-term control mode, referred to herein as a "near-term" set of output configurations, may include priorities which prioritize minimizing the amount of elapsed time required for the output configuration to minimize the difference between the climate condition in the associated region to reach and the optimal comfort condition for that region. In another example, one set of output configurations generated according to a far-term control mode, referred to herein as a "far-term" configuration, can include priorities which prioritize minimizing the long-term variation of the climate condition in the associated region from the optimal comfort condition for that region and may lack priorities which would prioritize minimizing the amount of elapsed time needed to minimize the difference between the climate condition and the optimal comfort condition. In another example, one set of output configurations generated according to an energy-efficient control mode, referred to herein as an "energy-efficient" configuration, can include priorities which prioritize minimizing energy usage by the various vehicle components controlled to control the climate condition in the given region.

At 708, the multiple sets of output configurations of each of the regions are synthesized to generate individual sets of output configurations for each of the regions. For each region, such synthesis can include adjusting a set of priorities to include priorities associated with multiple control modes, balancing certain conflicting priorities of separate control modes against each other, etc. The synthesized set of output configurations can be generated according to the adjusted set of priorities.

In some embodiments, such synthesis can include selecting one of the sets of output configurations for a given cabin region. For example, where a region is unoccupied but projected to be occupied within an immediate period of time, the synthesizing can include selecting the near-term output configuration without accounting for the far-term and energy-efficient output configurations. Where a region is unoccupied but projected to be occupied within a less-immediate period of time, the synthesizing can include synthesizing the far-term and energy-efficient output configurations only, without considering the near-term configuration.

In some embodiments, the determining and synthesizing illustrated in 706 and 708 can be combined into a single process which, for the various cabin regions, determines a single set of output configurations according to priorities associated with various selected climate control modes. For example, where a cabin region is occupied, a set of output configurations can include a set of output configurations which, within an immediate time period, optimize the interior climate condition of the given region relative to the optimal comfort condition of the region, and within a less-immediate time period, minimize variation from the optimal comfort condition, while maximizing usage of vehicle components which minimize energy usage and do not cause climate conditions to exceed optimal comfort condition thresholds in both time period.

At 710, one or more sets of output commands are generated based at least in part upon the synthesized sets of output configurations for each of the various cabin regions. As illustrated, the process 702-710 can be implemented recursively, where new sets of output configurations can be synthesized, and new sets of output commands generated, based at least in part upon changes in one or more of the input data received, determined optimal comfort conditions for one or more of the cabin regions, etc.

Figure 8:
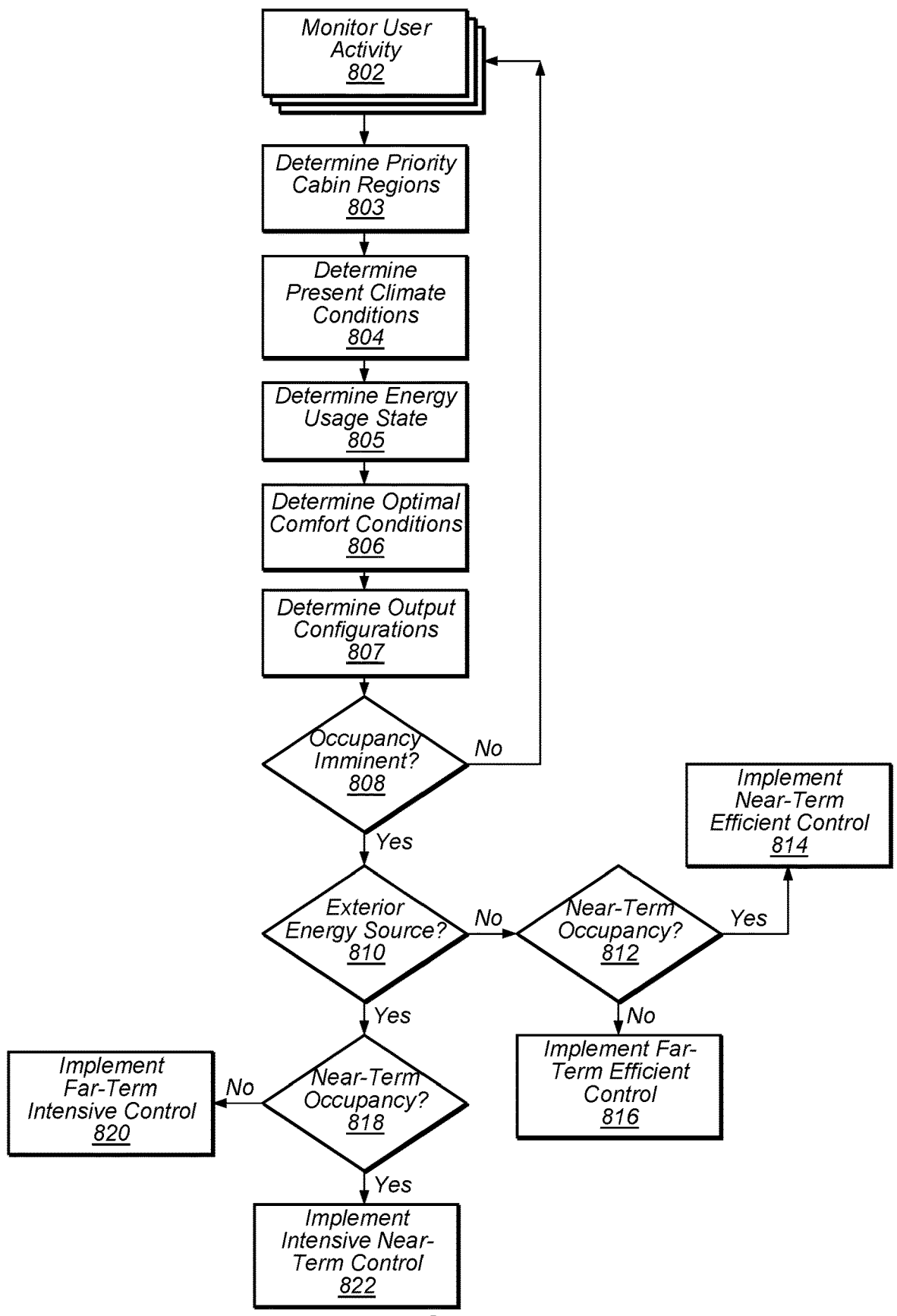
FIG. 8 is a flowchart of a method for controlling climate conditions in various cabin regions of a vehicle cabin based at least in part upon data associated with a user who is external to the vehicle, according to some embodiments.

FIG. 8 is a flowchart of a method for controlling climate conditions in various cabin regions of a vehicle cabin based at least in part upon data associated with a user who is external to the vehicle, according to some embodiments. The method can be implemented by one or more of the climate control systems illustrated in the above figures. In some embodiments, some or all of the method illustrated in FIG. 8 is implemented autonomously, without input from an end user via direct interaction with a user interface of one or more computer systems, via user commands received from a device supporting the user, some combination thereof, or the like.

At 802, user activity data associated with one or more users is monitored. Such users can include one or more particular users associated with the vehicle, one or more particular users supported by user devices determined, based at least in part upon interaction with same via wireless ad hoc network, to be located within a certain proximity of the vehicle, some combination thereof, etc. The user activity data can include data stored in one or more user devices supporting the user, data stored in one or more remote computer systems and accessed via communication with one or more network services via a communication network, including data associated with a user service account, data stored in a cloud storage service, etc. The user activity data can include a present state of the user, including present health statistics, present and recent user interactions with various devices and services, present and recent user transactions. User activity schedules, historical user activity patterns, some combination thereof, or the like. For example, user activity data can include data, accessed from a user device supporting the user, indicating that the user has just completed purchasing one or more items at a store which is geographically proximate to the vehicle. In another example, user activity data can include a historical activity pattern indicating that, historically, the user has entered the vehicle within a certain period of time from the present time. In another example, user activity data can include health data indicating that the user's heart rate is elevated above normal.

At 803, one or more priority cabin regions are identified and associated with a corresponding user, based at least in part upon the monitoring of user activity data. A priority cabin region can refer to a cabin region which a particular monitored user is anticipated to occupy upon entering the vehicle. For example, one user, based at least upon historical activity pattern data associated with the user, can be anticipated to occupy the cabin region encompassing the front-left seat of the vehicle cabin, while another user, based at least upon historical activity pattern data associated with the other user, can be anticipated to occupy another cabin region encompassing at least one of the rear seats of the vehicle. Such anticipation can be determined independently of any user-initiated commands. For example, a user can be anticipated to occupy a particular cabin region within a particular period of time based on monitoring user activity data where the user does not interact with any user device communicatively coupled to the vehicle to initiate climate control commands, remote vehicle access commands, etc. with regard to the vehicle.

At 804, present climate conditions in various regions associated with the interior and exterior of the vehicle are determined. Such determination can be based at least in part upon receiving and processing input data from various environmental sensors of the vehicle, interaction with various network services via a communication network, some combination thereof, etc.

At 805, an energy usage state associated with the vehicle is determined. The energy usage state can be determined based at least in part upon input data including energy usage data associated with various vehicle components and energy sources, including onboard energy sources including batteries, generators, engines, fuel sources, external energy sources, some combination thereof, etc.

At 806, optimal comfort conditions are determined for each of the one or more cabin regions. For each priority cabin region, a separate optimal comfort condition associated with the corresponding user can be determined. The optimal comfort condition for a given region can be based at least in part upon monitored user activity data associated with the corresponding user, user data indicating one or more of user climate condition preferences of the corresponding user, user health data associated with the corresponding user, present user activities associated with the corresponding user, historical user activity patterns associated with the corresponding user, user activity schedules associated with the corresponding user, present geographic locations, relative to the vehicle, of user devices associated with the corresponding user, some combination thereof, or the like.

Where a cabin region is not a priority cabin region, an optimal comfort condition for the region can be associated with a comfort condition of one or more other priority cabin regions. For example, a cabin region which is adjacent to a priority cabin region may be associated with the priority cabin region as a heat sink area, airflow bypass region, etc. As a result, the optimal comfort condition for the cabin region may have a temperature gradient which includes environmental conditions beyond the optimal comfort conditions of the priority cabin region, and can lack threshold ranges. For example, a non-priority cabin region may have an optimal comfort condition which lacks airflow thresholds, an infinite airflow threshold range, etc. In some embodiments, the thresholds included in an optimal comfort condition of a non-priority cabin region are associated with a proximity, location, etc. of the non-priority cabin region to a priority cabin region. For example, a non-priority cabin region which is adjacent to a priority cabin region can have an optimal comfort condition with more restrictive airflow threshold ranges than another non-priority cabin region which is not adjacent to the priority cabin region, so that airflow through the adjacent region does not disturb the potential occupant(s) in the priority cabin region.

At 807, one or more sets of output configurations are determined for each of the various cabin regions to implement the determined optimal comfort conditions of the corresponding regions. A set of output configurations, for a given region, can comprise a set of configurations of one or more particular vehicle components, including particular coolant flowrates and air moving device operating levels for one or more ACU components, particular damper positions and orientations of one or more particular air vents, positions of one or more windows, positions of one or more sunroofs, some combination thereof, etc. A set of output configurations can include separate sets of configurations of each individual vehicle component, where the configurations change over time according to various control algorithms, so that the operating state of the vehicle component changes over time. For example, a set of output configurations can include a set of configurations of an ACU fan, where the set of configurations includes a configuration of operating at maximum operating level for a first period of time, progressively reducing operating levels during a subsequent second period of time, and operating at a reduced operating level during a subsequent third period of time. Determination of an output configuration to implement an optimal comfort condition in one region can include consideration of optimal comfort conditions in other regions, output configurations to implement the optimal comfort conditions in the other regions, some combination thereof, etc.

In some embodiments, multiple separate sets of output configurations are determined for each region, wherein each set of output configurations is determined according to different control modes. For example, one set of output configurations generated according to a near-term control mode, referred to herein as a "near-term" configuration, may include priorities which prioritize minimizing the amount of elapsed time required for the output configuration to minimize the difference between the climate condition in the associated region to reach and the optimal comfort condition for that region. In another example, one set of output configurations generated according to a far-term control mode, referred to herein as a "far-term" configuration, can include priorities which prioritize minimizing the long-term variation of the climate condition in the associated region from the optimal comfort condition for that region and may lack priorities which would prioritize minimizing the amount of elapsed time needed to minimize the difference between the climate condition and the optimal comfort condition. In another example, one set of output configurations generated according to an energy-efficient control mode, referred to herein as an "energy-efficient" configuration, can include priorities which prioritize minimizing energy usage by the various vehicle components controlled to control the climate condition in the given region.

At 808, a determination is made, based at least in part upon the monitoring of user activity, the determined present climate conditions in the vehicle cabin regions, the determined optimal comfort conditions for said regions, the determined sets of output configurations, some combination thereof, etc. regarding whether or not at least one of the one or more monitored users is anticipated to enter the vehicle within a certain time period threshold. The time period threshold may be associated with an estimated period of time required for the climate control system to control one or more vehicle components to change the climate conditions in at least one cabin region to within a certain margin of the optimal comfort condition for that given cabin region. The time period threshold can be based at least in part upon the energy usage data; for example, where the vehicle is presently connected to an external energy source, and receiving power from same, the time period threshold may be lower than if the vehicle is not connected to an external energy source and is restricted to supplying energy to one or more vehicle components from an onboard energy source. In some embodiments, the time period threshold is a predetermined time period value.

At 810, a determination is made whether the vehicle is presently connected to an external energy source, such that the external energy source can be used to supply energy to operate one or more vehicle components which can be controlled by the climate control system to adjust the climate conditions in one or more cabin regions. For example, where a vehicle is connected to an electrical power outlet which can supply utility power to supplement, charge, replace, etc. the onboard energy source, the vehicle can be determined to be presently connected to an external energy source If not, then a determination can be made that only onboard energy sources are available. As one or more of such onboard energy source may be able to supply energy for a limited period of time, e.g., due to a limited supply of fuel or stored energy for the onboard energy source, a determination that only onboard energy source are available can result in the climate control system controlling climate conditions in various cabin regions utilizing vehicle components which require relatively less energy usage that other vehicle components. For example, if only onboard energy sources are available, a decision can be made to synthesize any potential output configurations with an energy-efficient output configuration, so that the energy usage in changing the climate conditions of the cabin regions are optimized.

At 812, a determination is made, based at least in part upon the monitoring of user activity, the determined present climate conditions in the vehicle cabin regions, and the determined optimal comfort conditions for said regions, regarding whether or not the user is anticipated to enter the vehicle within a near-term time period threshold. The near-term time period threshold can be associated with an estimated minimum time period required to change the climate condition of one or more cabin regions to within a margin range of the optimal comfort condition for that particular region utilizing a set of output configurations which comprise a synthesis of the energy-efficient output configuration and the far-term output configuration. If the user is anticipated to enter the vehicle within the near-term time period threshold, as shown at 814, the determination can be made that the far-term output configuration may not result in the optimal comfort condition before the user enters the vehicle. As a result, at 814, a determination can be made to synthesize a set of output configurations using both the near-term set of output configurations and the energy-efficient set of output configurations, so that both energy usage and the time to change the climate condition in one or more cabin regions to within a margin of the optimal comfort condition for that cabin region are optimized.

At 816, based at least in part upon a determination that the user is not anticipated to enter the vehicle within the neat-term time period threshold, a determination can be made to synthesize a set of output configurations using both the far-term set of output configurations and the energy-efficient set of output configurations, so that energy usage is optimized. Because the user is not anticipated to enter the vehicle for less than the minimum amount of time required to change the climate condition of the particular cabin region, the need to change climate conditions quickly is reduced, and energy-efficient output configurations can be prioritized in order to conserve the onboard energy sources.

At 822, based at least in part upon the monitoring of user activity, the determined present climate conditions in the vehicle cabin regions, and the determined optimal comfort conditions for said regions, a determination can be made to synthesize a set of output configurations using the near-term set of output configurations and not the energy-efficient set of output configurations, so that the time to change the climate condition in one or more cabin regions to within a margin of the optimal comfort condition for that cabin region is optimized, despite doing so at the expense of energy usage. Because the vehicle is determined to be connected to an external energy source, minimizing energy usage is a lesser priority than optimizing comfort.

As referred to herein, a set of "margins" can include a range of values associated with one or more climate condition characteristics, including a particular dry bulb temperature range (e.g., degrees Fahrenheit), a particular air flow rate range (e.g., cubic meters per second), air flow velocity range (e.g., meters per second), relative humidity, a particular energy usage range (e.g., kW), some combination thereof, etc.

Example Computer System

FIG. 9 illustrates an example computer system 900 that may be configured to include or execute any or all of the embodiments described above. In different embodiments, computer system 900 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system, as described herein, may be executed in one or more computer systems 900, which may interact with various other devices. Note that any component, action, or functionality described above with respect to FIGS. 1 through 8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices, which can include one or more user interface devices. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 925, data 926, etc. accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 920 may be configured to implement some or all of a vehicle climate control system incorporating any of the functionality described above. Additionally, existing vehicle component control data of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network 950 (e.g., carrier or agent devices) or between nodes of computer system 900. Network 950 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 900. Multiple input/output devices may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, which may be processor-executable to implement any element, module or action described above. In one embodiment, the program instructions, when executed by one or more processors 910, may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A vehicle climate control system, comprising:
an input data module configured to determine a first set of climate conditions associated with an occupied cabin region of an interior cabin of a vehicle, based at least in part upon a set of input data received from one or more data sources;
a processing module configured to determine, based at least in part upon the first set of climate conditions associated with the occupied cabin region, a set of optimal comfort conditions which comprises at least one optimal occupant-perceptible cabin region temperature of the occupied cabin region and a first set of climate condition thresholds associated with at least one climate condition not including cabin region temperature; and
an output command module configured to generate a set of output commands to control one or more vehicle components to approximate the at least one optimal occupant-perceptible cabin region temperature in the occupied cabin region, wherein the set of output commands cause the one or more vehicle components to:
change the first set of climate conditions of at least the occupied cabin region, within the first set of climate condition thresholds; and
change a second set of climate conditions in an unoccupied cabin region of the interior cabin, within a second set of climate condition thresholds separate from the first set of climate condition thresholds.

2. The vehicle climate control system of claim 1, wherein:
the input data module is configured to determine a respective set of climate conditions associated with each of a plurality of separate portion of the occupied cabin region, wherein each separate portion of the occupied cabin region is occupied by at least one of a plurality of occupant body parts; and
the set of optimal comfort conditions comprises, for each separate portion of the plurality of separate portions, a separate optimal occupant-perceptible cabin region temperature and the second set of climate condition thresholds associated with at least one climate condition separate from cabin region temperature;
wherein the separate optimal occupant-perceptible cabin region temperature and the second set of climate condition thresholds are determined based at least in part upon the at least one body part occupying the respective separate portion.

3. The vehicle climate control system of claim 1, wherein:
the processing module is further configured to determine the second set of climate condition thresholds based on a determination whether the unoccupied cabin region is adjacent to the occupied cabin region.

4. The vehicle climate control system of claim 1, wherein:
the processing module is configured to generate a set of output configurations of the one or more vehicle components, according to both the first set of optimal comfort conditions and one or more particular sets of control mode priorities which prioritize one or more characteristics of the set of output configurations of the one or more vehicle components; and
the output command module is configured to generate the set of output commands to control one or more vehicle components to change the first set of climate conditions of at least the occupied cabin region, within the first set of climate condition thresholds, to approximate the at least one optimal occupant-perceptible cabin region temperature, according to the set of output configurations of the one or more vehicle components.

5. The vehicle climate control system of claim 4, wherein:
the one or more particular sets of control mode priorities comprises one or more of:
a control mode priority which prioritizes minimizing an elapsed period of time in which the first set of climate conditions associated with the occupied cabin region approximates the at least one optimal occupant-perceptible cabin region temperature; or
a control mode priority which prioritizes minimizing vehicle component energy usage.

6. The vehicle climate control system of claim 4, comprising:
an interface module configured to present, to one or more occupants of the interior cabin, one or more of:
a graphical user interface configured to display a set of graphical representations associated with the set of output configurations;
a set of audio signals, generated by one or more audio sources in the interior cabin, which indicate the generation of the set of output configurations; or
a set of light emissions, generated by one or more light sources in the interior cabin according to one or more sequences, which indicate the generation of the set of output configurations.

7. The vehicle climate control system of claim 1, wherein:
to generate a set of output commands to control one or more vehicle components, the output command module is configured to generate a set of output commands to a control element associated with the at least one cabin air vent to adjust a damper position and housing orientation of the at least one cabin air vent to conform to a particular air flow rate and air flow direction of airflow through the at least one cabin air vent.

8. The vehicle climate control system of claim 7, wherein:
the output command module is configured to generate a set of output commands to a control element associated with the at least one cabin air vent to adjust a damper position and housing orientation of the at least one cabin air vent which configures the at least one cabin air vent to direct an airflow across a cabin surface of the interior cabin to remove heat from the cabin surface.

9. A method, comprising:
performing, by at least one computer system:
determining a first set of climate conditions associated with a cabin region of an interior cabin of a vehicle which is occupied by at least one occupant, based at least in part upon a set of input data received from one or more data sources;
determining, based at least in part upon the first set of climate conditions associated with the cabin region occupied by the at least one occupant, an optimal set of climate conditions which comprises an optimal cabin region temperature perceptible by the at least one occupant and a first set of climate condition thresholds pertaining to the at least one occupant; and
generating a set of output commands to control one or more vehicle components to approximate the at least one optimal occupant-perceptible cabin region temperature perceptible by the at least one occupant, wherein the set of output commands cause the one or more vehicle components to:
change the first set of climate conditions associated with at least the cabin region, within the first set of climate condition thresholds; and
change a second set of climate conditions associated with an unoccupied cabin region, within a second set of climate condition thresholds separate from the first set of climate condition thresholds.

10. The method of claim 9, wherein:
determining a first set of climate conditions associated with a cabin region of an interior cabin of a vehicle which is occupied by at least one occupant comprises determining a respective set of climate conditions associated with each of a plurality of separate portions of the cabin region, wherein each separate portion of the cabin region is occupied by a particular occupant body part of the occupant; and
determining an optimal cabin region temperature perceptible by the at least one occupant and a first set of climate condition thresholds associated with the at least one occupant comprises determining, for each separate portion of the plurality of separate portions, a separate optimal cabin region temperature perceptible by the particular occupant body part included in the separate portion and a third set of climate condition thresholds associated with the particular occupant body part.

11. The method of claim 10, further comprising:
determining a respective set of climate conditions associated with each of a plurality of separate portions of the cabin region, wherein each separate portion of the cabin region is occupied by a particular occupant body part of the occupant, comprises determining a present sensitivity of the particular occupant body part based upon a determination of whether the particular occupant body part occupying a particular portion of the cabin region is covered by one or more instances of clothing; and
determining the optimal cabin region temperature perceptible by the particular occupant body part and the fourth set of climate condition thresholds associated with the particular occupant body part is based at least in part upon the determined present sensitivity of the particular occupant body part.

12. The method of claim 9, comprising:
determining the second set of climate conditions associated with the unoccupied cabin region of the interior cabin based on the first set of climate conditions associated with at least the cabin region.

13. The method of claim 9, comprising:
generating a set of output configurations of the one or more vehicle components, according to both the optimal set of climate conditions and one or more particular sets of vehicle component weights which weight one or more characteristics of the set of output configurations of the one or more vehicle components; and
generating the set of output commands, based at least in part upon the set of output configurations of the one or more vehicle components.

14. The method of claim 13, wherein:
the one or more particular sets of vehicle component weights comprises one or more of:
a weight which weights output configurations associated with a reduced elapsed period of time in which the set of climate conditions associated with the cabin region approximates the optimal cabin region temperature perceptible by the at least one occupant; or
a weight which weights output configurations associated with a reduced vehicle component energy usage.

15. The method of claim 9, wherein:
generating a set of output commands to control one or more vehicle components comprises generating a set of output commands to a control element associated with the at least one cabin air vent to adjust a damper position and housing orientation of the at least one cabin air vent to conform to a particular air flow rate and air flow direction of airflow through the at least one cabin air vent.

16. A non-transitory, computer-readable medium storing a program of instructions which, when executed by at least one computer system, causes the at least one computer system to:
associate at least one cabin region of a vehicle cabin with an optimal occupant-perceptible cabin region temperature and a first set of climate condition thresholds of at least one climate condition not including cabin region temperature;
determine, based on the optimal occupant-perceptible cabin region temperature and the first set of climate condition thresholds, an output configuration of one or more sets of vehicle components which adjusts climate conditions in the at least one cabin region, within the first set of climate condition thresholds, according to one or more control mode priorities; and
generate a set of output commands to the one or more sets of vehicle components to:
change the first set of climate conditions in the at least one cabin region according to the determined output configuration; and
change a second set of climate conditions associated with another cabin region, within a second set of climate condition thresholds separate from the first set of climate condition thresholds.

17. The non-transitory, computer-readable medium of claim 16, wherein:
the at least one cabin region comprises an occupied cabin region occupied by at least one occupant;
the occupied cabin region comprises a plurality of cabin region portions associated with at least one body part of a plurality of body parts of the at least one occupant; and
associating at least one cabin region of a vehicle cabin with an optimal occupant-perceptible cabin region temperature and a first set of climate condition thresholds comprises associating separate cabin region portions of the plurality of cabin region portions with separate sets of optimal occupant-perceptible cabin region temperatures and climate condition thresholds, based at least in part upon the one or more occupant body parts associated with in the respective cabin region portion.

18. The non-transitory, computer-readable medium of claim 16, wherein:
the at least one cabin region comprises an occupied cabin region occupied by at least one occupant and an unoccupied cabin region;
associating at least one cabin region of a vehicle cabin with an optimal occupant-perceptible cabin region temperature and a first set of climate condition thresholds comprises associating the occupied cabin region with an optimal occupant-perceptible cabin region temperature and a third set of climate condition thresholds which are associated with the at least one occupant;
determining an output configuration of one or more sets of vehicle components which adjusts climate conditions in the at least one cabin region according to one or more control mode priorities comprises determining an output configuration of one or more sets of vehicle components which:
adjusts climate conditions in the occupied cabin region, according to at least the set of climate condition thresholds, such that the cabin region temperature in the occupied cabin region approximate optimal occupant-perceptible cabin region temperature; and
adjusts climate conditions in the unoccupied cabin region, independently of the set of climate condition thresholds, such that such that the cabin region temperature in the occupied cabin region approximate optimal occupant-perceptible cabin region temperature.

19. The non-transitory, computer-readable medium of claim 16, wherein:
the one or more control mode priorities comprises one or more of:
a control mode priority which prioritizes output configurations of one or more vehicle components which results in a reduced elapsed period of time in which the first set of climate conditions associated with the at least one cabin region approximates the optimal occupant-perceptible cabin region temperature; or
a control mode priority which prioritizes output configurations of one or more vehicle components which results in a reduced vehicle component energy usage.

20. The non-transitory, computer-readable medium of claim 16, wherein:
the at least one cabin region is presently unoccupied; and
the program of instructions, when executed by at least one computer system, causes the at least one computer system to:
determine, based at least in part upon one or more sets of data received from one or more data sources, that at least one individual which is presently external to the vehicle cabin is anticipated to occupy the at least one cabin region of an interior cabin of the vehicle within a particular period of time; and
generating the set of output commands to the one or more sets of vehicle components to change the first set of climate conditions in the at least one cabin region according to the determined output configuration, based at least in part upon the determination that the at least one individual is anticipated to occupy the at least one cabin region within the particular period of time.

* * * * *